(12) United States Patent
Tamaoki

(10) Patent No.: US 8,274,732 B2
(45) Date of Patent: Sep. 25, 2012

(54) OPTICAL MODULE

(75) Inventor: Shinobu Tamaoki, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 429 days.

(21) Appl. No.: 12/692,281

(22) Filed: Jan. 22, 2010

(65) Prior Publication Data

US 2010/0188735 A1 Jul. 29, 2010

(30) Foreign Application Priority Data

Jan. 26, 2009 (JP) ................. P2009-014276

(51) Int. Cl.
*H04B 10/17* (2006.01)
*G02B 6/245* (2006.01)
*G02B 6/255* (2006.01)
*G02B 6/036* (2006.01)

(52) U.S. Cl. ............... 359/341.3; 359/341.1; 385/27; 385/39; 385/50; 385/51

(58) Field of Classification Search ........... 359/341.1, 359/341.3; 385/27, 39, 50, 51
See application file for complete search history.

(56) References Cited

U.S. PATENT DOCUMENTS

| | | | |
|---|---|---|---|
| 6,335,822 B1 * | 1/2002 | Toyohara | 359/341.1 |
| 6,477,295 B1 * | 11/2002 | Lang et al. | 385/31 |
| 6,948,862 B2 * | 9/2005 | Brown | 385/92 |
| 6,999,481 B1 * | 2/2006 | Jurgensen | 372/6 |
| 7,044,660 B2 * | 5/2006 | Pan et al. | 385/93 |
| 2004/0005120 A1 * | 1/2004 | Takeda et al. | 385/60 |
| 2009/0080835 A1 * | 3/2009 | Frith | 385/50 |

FOREIGN PATENT DOCUMENTS

| | | |
|---|---|---|
| JP | 2008-187100 | 8/2008 |
| JP | 2008-268747 | 11/2008 |

* cited by examiner

*Primary Examiner* — Eric Bolda
(74) *Attorney, Agent, or Firm* — Venable LLP; Michael A. Satori

(57) ABSTRACT

The present invention relates to an optical module having a structure for reducing adverse contingencies such as increased number of fusion splicing points, drops in output, and higher costs associated with a greater number of optical components. The optical module comprises an amplification optical fiber, a transmission optical fiber, and a fusion splicing structure that fusion-splices the amplification optical fiber to the transmission optical fiber, in a state where a cover layer is removed at the tip portions, including the end faces, of these optical fibers. The fusion splicing structure includes a pumping light removing resin that covers directly the tip portions of the amplification optical fiber and the transmission optical fiber from which the cover layer is removed. The pumping light removing resin has a higher refractive index than a first cladding of the amplification optical fiber. The above configuration allows transmitted pumping light, for which the confinement effect by the first cladding of the amplification optical fiber is cancelled, to escape more efficiently out of the fusion splicing portion.

9 Claims, 21 Drawing Sheets

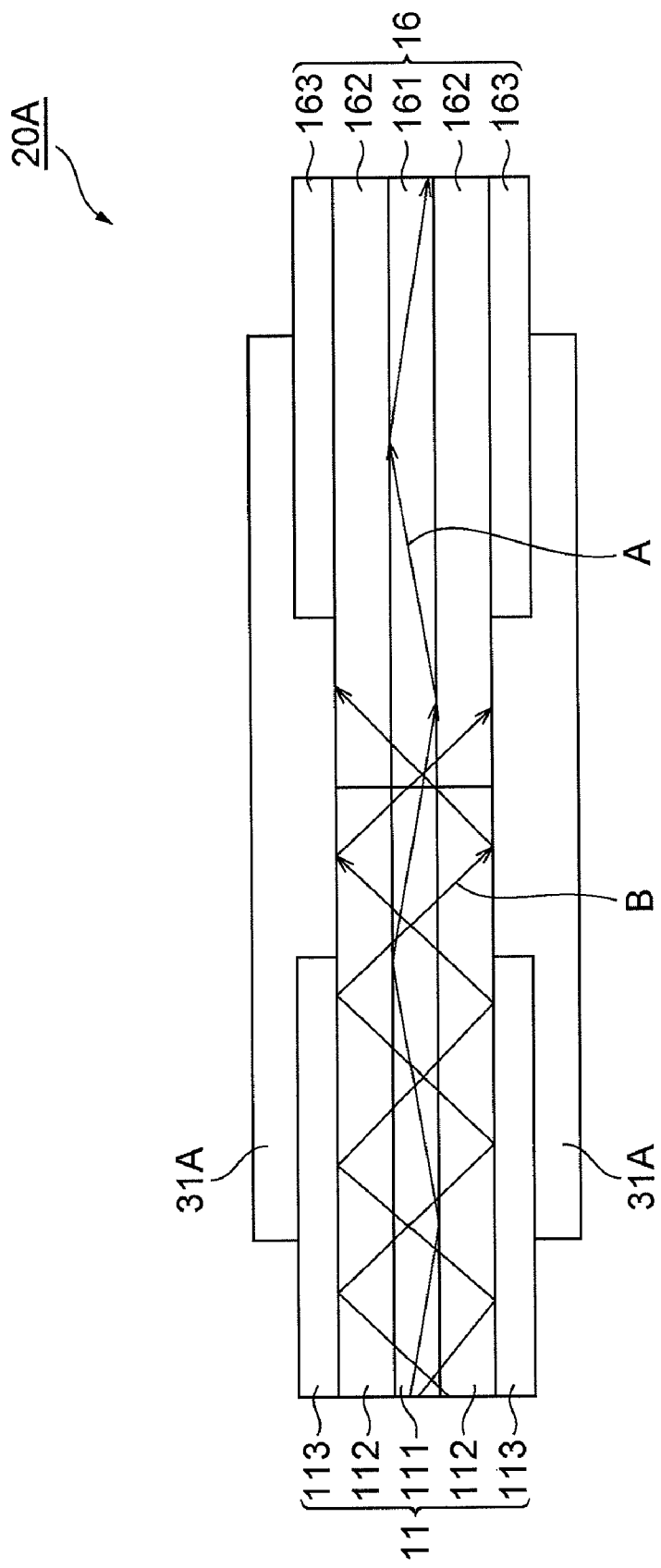

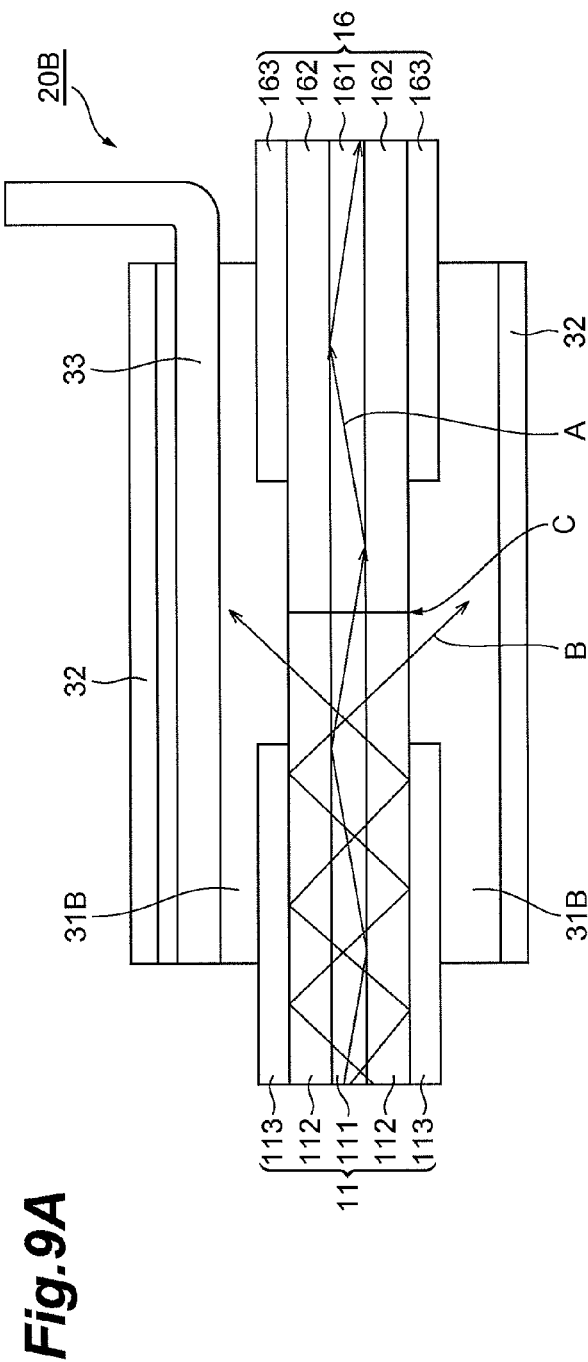
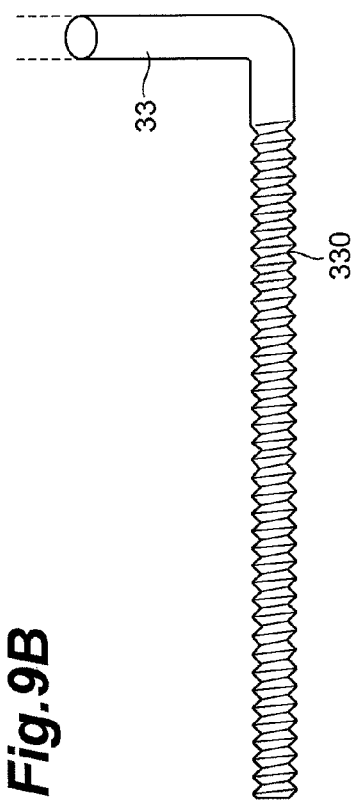
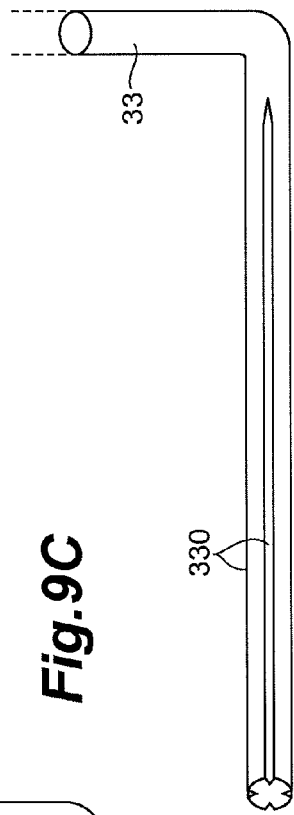
Fig.9A
Fig.9B
Fig.9C

OPTICAL MODULE

BACKGROUND OF THE INVENTION

1. Field of the Invention

The present invention relates to an optical module comprising an amplification optical fiber and a propagation optical fiber that are spliced to each other.

2. Related Background of the Invention

Recent years have witnessed growing interest in processing technologies that use laser light, and therefore the need for high-output laser light sources is ever greater in a wide variety of fields such as machinery manufacture, medicine and the like. Laser light sources that have been the focus of particular attention include fiber laser light sources, which use an amplification optical fiber, doped with rare earth elements such as Yb, Er, Tm and the like, as an amplification medium. In such fiber laser light sources, high-output laser light can be created within an amplification optical fiber by supplying pumping light to the amplification optical fiber, which is disposed inside a resonator structure. Fiber laser light sources are advantageous in that laser light is confined within the fiber. Therefore, such sources are easy to handle and have good thermal-radiation properties, and hence do not require large cooling equipment.

As an example of a technology in which such an amplification optical fiber is fusion-spliced to other optical fibers, Japanese Patent Application Laid-open No. 2008-187100 (Document 1) discloses the feature of providing a heat-transport portion, and a layer of a residual-light transmitting substance around a protective coating, with a view to removing pumping light in an optical fiber disposed after an amplification optical fiber. Meanwhile, Japanese Patent Application Laid-open No. 2008-268747 (Document 2) discloses the feature of causing pumping light to leak (removing pumping light) by providing a leak-light guide member in a fiber fused portion, and the feature of transporting heat by fixing the leak-light guide member to a heat-transport member by way of a resin member. These examples underscore the problem of how to treat pumping light after fusion splicing.

The resonator-type fiber laser light source shown in FIG. 1, for example, is configured so as to prevent pumping light from leaving the resonator, i.e. so as to prevent pumping light from propagating forward from the fiber splicing portion.

SUMMARY OF THE INVENTION

The present inventors have examined the above conventional fiber laser light sources, and as a result, have discovered the following problems.

Namely, a rare earth element-doped optical fiber is used as the amplification optical fiber in fiber laser light sources having an all-fiber structure (light source structures in which the light propagation path in the light source comprises only optical fibers). Among these optical fibers, YbDFs optical fibers doped with Yb (ytterbium) are widely used as high-power amplification optical fibers having high conversion efficiency. Like other rare earth elements, Yb is pumped also by pumping light. The pumping light that fails to be absorbed in the amplification optical fiber is emitted through the other end of the amplification optical fiber.

The amount of pumping light absorbed by the amplification optical fiber can be increased when the fiber laser light source has a resonator structure (for example, reflective mirrors or FBGs (Fiber Bragg Gratings) at both ends). However, the absorption in the amplification optical fiber is small in case of, for example, single pass configurations. In particular, therefore, single pass configurations require some means for dumping the pumping light that is not absorbed by the amplification optical fiber. When the amplification optical fiber is spliced to a transmission optical fiber, failure to dump the pumping light results in heating on account of the surplus pumping light. Such heating may ignite the cover resins of the transmission optical fiber and the splicing portion.

Pumping light can be dumped, for example, by using an optical filter for dumping the optical fiber. However, this results in a greater number of components in the fusion splicing structure between the amplification optical fiber and the transmission optical fiber, and is accompanied with problems in terms of, for example, adherence of special leak members and burning of a resin for removing pumping light. Document 2 uses a leak member, but adhesion between the outer periphery of the leak member and a heat-transport material is difficult. On the other hand, ordinary methods of protecting the fiber fused portion include, for example, covering the periphery of the fiber fused portion with a resin, using a reinforcing member in the resin, and covering the outside of the reinforcing member with a protective sleeve. In the above conventional technique, however, the resin is not intended to remove leaked light. Even when some leaked light is absorbed by the resin, the resulting risk of combustion of the resin portion has not been accounted for in the technique. Therefore, structures such as the above have not been used in fiber laser light sources where high-output pumping light is employed. The inventors have attempted to use the above structure in actual fiber laser light sources where a fiber fused portion is covered by a high-refractive index resin. These attempts have highlighted the problem of resin burning when the pumping light output is high.

The present invention has been developed to eliminate the problems described above. It is an object of the present invention to provide an optical module that uses a novel structure for removing pumping light and transporting heat, such that excessive light is heat-transported out of a fiber fused portion with greater efficiency.

The optical module according to the present invention comprises an amplification optical fiber, a transmission optical fiber, a pumping light source, and a fusion splicing structure. The amplification optical fiber includes a core extending along a predetermined axis, a first cladding provided on the outer periphery of the core, and a second cladding provided on the outer periphery of the first cladding. Light to be amplified propagates through the interior of the core. Pumping light propagates through the interior of the first cladding. The second cladding has a lower refractive index than the first cladding and functions as a cover resin to the first cladding. The pumping light source supplies pumping light to the amplification optical fiber. The transmission optical fiber, allowing single mode propagation of the light to be amplified, is provided on the end from which the pumping light is outputted, of the ends of the amplification optical fiber. The fusion splicing structure connects the amplification optical fiber to the transmission optical fiber, in a state where a cover resin is removed at the tip portions, including the end faces thereof, of the amplification optical fiber and the transmission optical fiber.

In particular, the fusion splicing structure includes a pumping light removing resin, and a reinforcing member. The pumping light removing resin makes up part or the entirety of a protective sleeve that covers directly the tip portions of the amplification optical fiber and the transmission optical fiber from which the cover resin is removed. The pumping light removing resin has a higher refractive index than the first cladding of the amplification optical fiber. The reinforcing member comprises a material that resists heat shrinkage of the protective sleeve. The reinforcing member is disposed inside the protective sleeve in a state where a portion of the reinforcing member including at least one of the ends thereof, or a portion including both ends, is disposed outside the pumping light removing resin. In such a reinforcing member, heat migrates from a portion covered by the pumping light removing resin (including one end positioned inside the protective sleeve) to a portion exposed from the pumping light removing resin (including the other end). The above configuration allows transporting heat that accumulates in the reinforcing member, through the projecting portion of the reinforcing member that projects beyond the pumping light removing resin and that includes the other end of the reinforcing member.

In the optical module according to the present invention, the reinforcing member preferably have heat radiating means for enhancing heat transportation, provided in the projecting portion. In addition, it is preferable that the reinforcing member has a melting point equal to or higher than the melting point of the pumping light removing resin. It is preferable that the reinforcing member has a thermal conductivity of 100 $W \cdot m^{-1} \cdot K^{-1}$ or more at normal temperature (25° C.). It is preferable that the reinforcing member has a groove on the surface thereof. The reinforcing member has an absorption coefficient whose value at a wavelength of pumping light is higher than that at a wavelength of light to be amplified. The optical module according to the present invention may further comprise a cover layer provided on the outer periphery of the pumping light removing resin. It is preferable that the cover layer has a refractive index lower than that of the pumping light removing resin but higher than that of air.

The optical module according to the present invention may further comprise a temperature detector and an alarm unit. The temperature detector detects a temperature of the reinforcing member. The alarm unit issues an alarm when the temperature detected by the temperature detector is equal to or lower than a predetermined temperature threshold value.

The optical module according to the present invention may further comprise a temperature detector and a control unit. The temperature detector detects a temperature of the reinforcing member. The control unit controls a pumping light source driving current that is supplied to the pumping light source, when the temperature detected by the temperature detector is equal to or lower than a predetermined temperature threshold value.

BRIEF DESCRIPTION OF THE DRAWINGS

FIG. 3 is a view showing a cross section of a fusion splicing structure of an amplification optical fiber and a transmission optical fiber;

FIGS. 9A to 9C are views showing the cross section of a fusion splicing structure of an amplification optical fiber and a transmission optical fiber;

DESCRIPTION OF THE PREFERRED EMBODIMENTS

Figure 1:
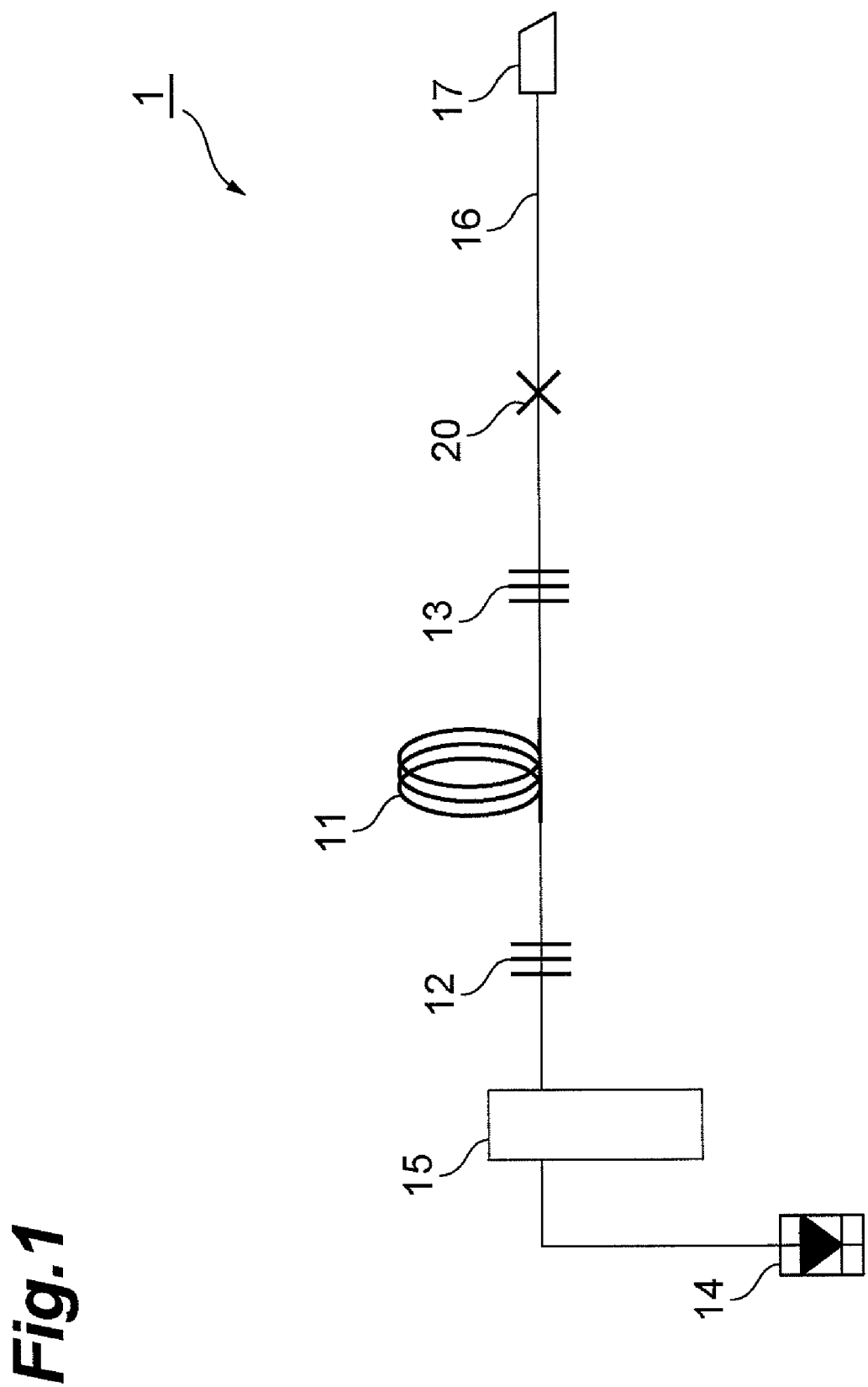
FIG. 1 is a view showing a configuration example of a resonator-type fiber laser light source.

In the following, embodiments of an optical module according to the present invention will be explained in detail with reference to FIGS. 1 to 3, 4A to 5B, and 6 to 21. In the description of the drawings, identical or corresponding components are designated by the same reference numerals, and overlapping description is omitted.

FIG. 1 is a view showing a configuration example of a resonator-type fiber laser light source. In a fiber laser light source 1 shown in FIG. 1, a laser resonator is made up of reflective units 12, 13 disposed at both ends of an amplification optical fiber 11. The reflective units 12, 13 are constituted by an FBG or a mirror reflector. The pumping light outputted by a pumping light source 14 passes through a combiner 15 and one of the reflective units 12, and is supplied to the amplification optical fiber 11, where it pumps rare earth elements contained in the amplification optical fiber 11. The light emitted by the amplification optical fiber 11 on account of the pumping travels back and forth between the reflective units 12, 13, to be amplified thereby by the amplification optical fiber 11. Some of the amplified light passes through the reflective unit 13, a transmission optical fiber 16 and an end cap 17, as is outputted as laser light.

Known pulse generation methods include methods in which optical switches or the like are inserted into a resonator. The presence or absence of an optical switch or the like is of no concern in the fiber laser light source 1 shown in FIG. 1. Types other than all-fiber structures include also types that output laser light to a spatial system after a resonator-type structure, but these types are impractical on account of associated problems such as alignment lens precision, and awkward handling.

The fiber laser light source 1 shown in FIG. 1 has an all-fiber structure. In such a structure, the optical fiber 16 for propagation of laser light must be fusion-spliced to the amplification optical fiber 11, in order to enable propagation of laser light obtained in a resonator structure. The optical fiber extending from the resonator structure and the transmission optical fiber 16 are fusion-spliced together. The resonator structure of FIG. 1 is an example of a design in which pumping light from the interior of the resonator does not leak out. No problems arise in such cases when a fusion splicing structure 20 of the fiber extending from the resonator and of the transmission optical fiber 16 is fixed.

Figure 2:
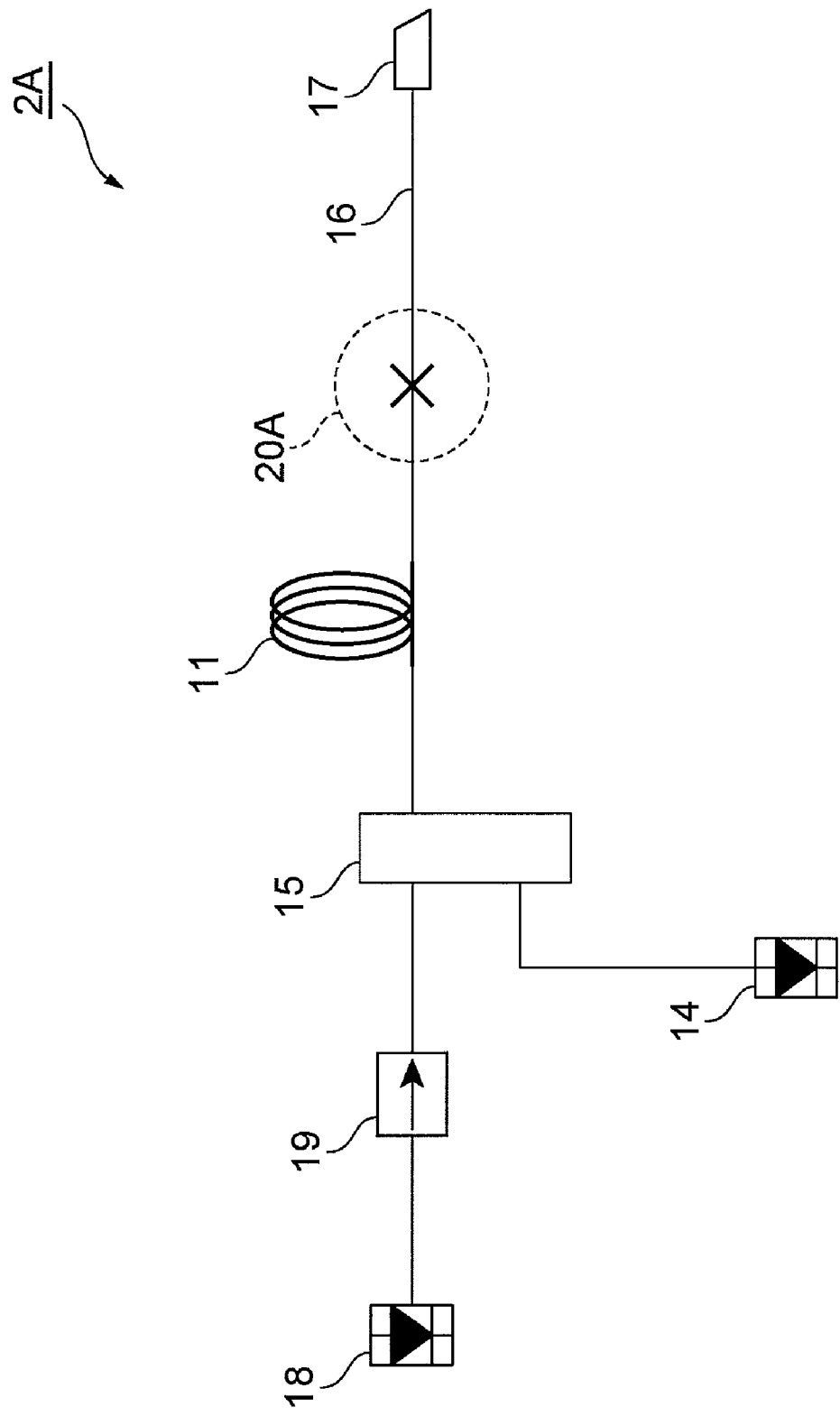
FIG. 2 is a view showing a configuration example of an MOPA-type fiber laser light source.

FIG. 2 is a view showing the configuration of an MOPA (Master Oscillator Power Amplifier) fiber laser light source 2A. In the fiber laser light source 2A shown in FIG. 2, pumping light outputted by the pumping light source 14 is supplied to the amplification optical fiber 11 via the combiner 15, to pump rare earth elements in the amplification optical fiber 11. Light to be amplified (seed light) outputted by a seed light source 18 passes through an optical isolator 19 and a combiner 15 and is inputted to the amplification optical fiber 11. The light to be amplified is amplified in the amplification optical fiber 11. The amplified light passes through the transmission optical fiber 16 and the end cap 17 and is outputted out of the fiber laser light source. The amplification optical fiber 11 and the transmission optical fiber 16 are fusion-spliced in a fusion splicing structure 20A (which includes a fiber fusion portion in which the end faces of the fibers abut each other).

Figure 4A:
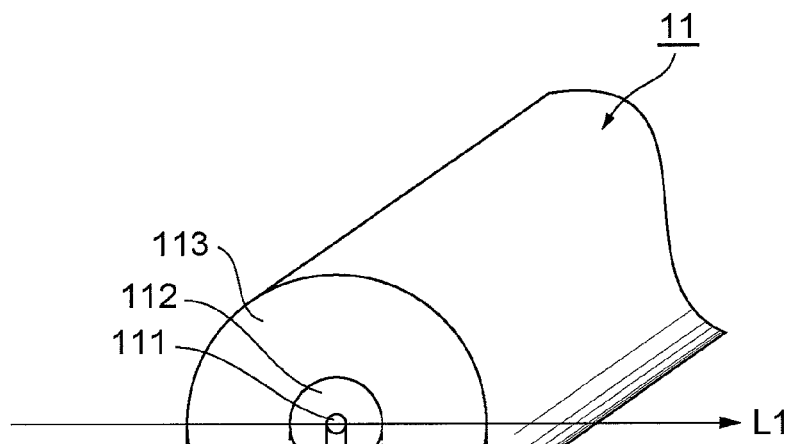
FIGS. 4A and 4B show the cross-sectional structure of an amplification optical fiber, and a refractive index profile thereof.
Figure 4B:
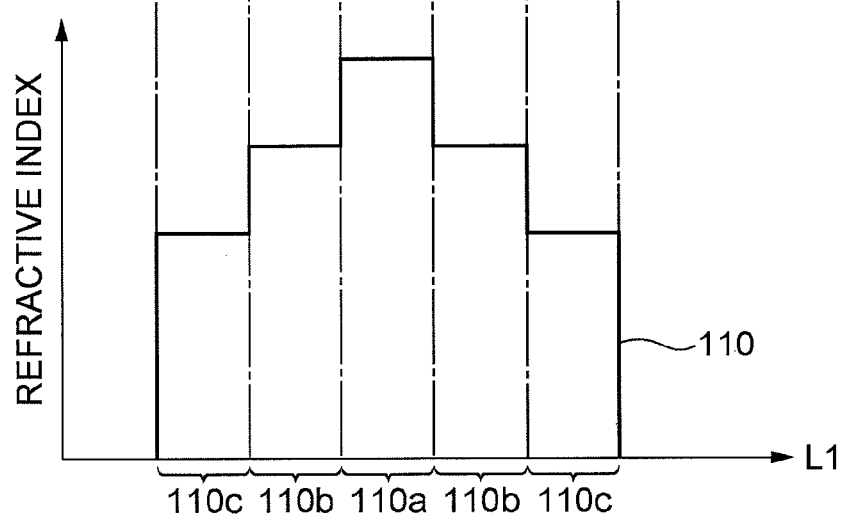
Figure 5A:
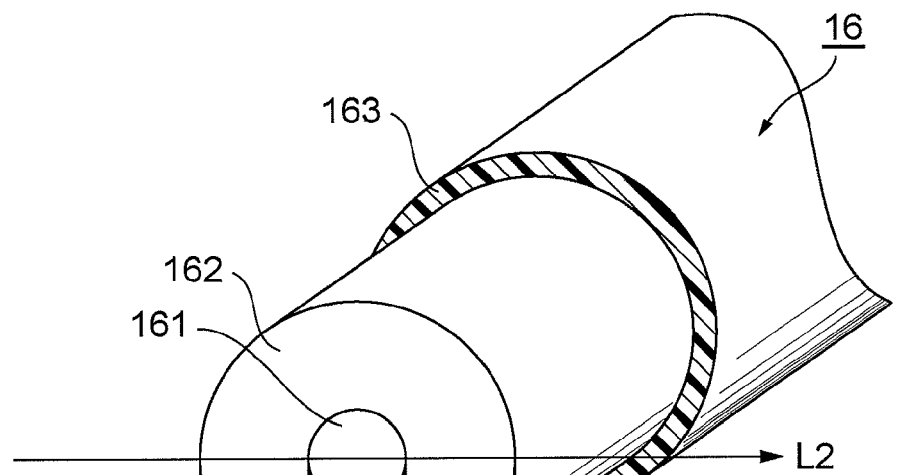
FIGS. 5A and 5B show the cross-sectional structure of a transmission optical fiber, and a refractive index profile thereof.
Figure 5B:
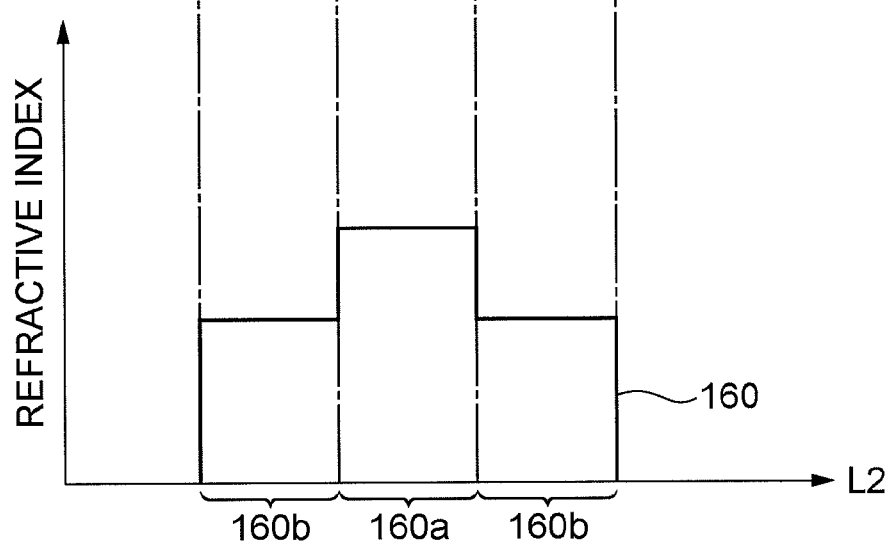

FIG. 3 is a view showing a cross section of the fusion splicing structure 20A of the amplification optical fiber 11 and the transmission optical fiber 16. FIG. 4A is a view showing the cross-sectional structure of the amplification optical fiber 11, and FIG. 4B is a refractive index profile thereof. FIG. 5A is a view showing the cross-sectional structure of the transmission optical fiber 16, and FIG. 5B is a refractive index profile thereof.

The amplification optical fiber 11 has a double-cladding configuration, and comprises, as shown in FIG. 4A, a core 111 through which light to be amplified A propagates; a first cladding 112 which is provided on the outer periphery of the core 111 and through which pumping light B propagates; and a second cladding 113, provided around the first cladding 112, and having a lower refractive index than the first cladding 112. The first cladding 112 has a lower refractive index than the core 111, and the second cladding 113 has a lower refractive index than the first cladding. The second cladding 113 functions as a cover resin for the first cladding 112. The main component of the core 111 and the first cladding 112 is silica glass. The core 111 is doped with a rare earth for amplification (for example, Yb, Er, Nd, Tm, Ho, Tb or the like).

FIG. 4B shows a refractive index profile of the various portions along line L1 shown in FIG. 4A. In the refractive index profile 110, region 110a denotes the refractive index of the core 111 along line L1, region 110b denotes the refractive index of the first cladding 112 along line L1, and region 110c denotes the refractive index of the second cladding 113 along line L1.

As shown in FIG. 5A, the transmission optical fiber 16 comprises a core 161 through which light to be amplified A propagates, a cladding 162 provided on the outer periphery of the core 161, and a resin 163 provided around the cladding 162. The transmission optical fiber 16 is provided on the end of the amplification optical fiber 11 from which pumping light B is outputted, of the ends of the amplification optical fiber 11. Only light to be amplified A propagates through the transmission optical fiber 16.

FIG. 5B shows a refractive index profile of the various portions along line L2 shown in FIG. 5A. In a refractive index profile 160, the region 160a denotes a refractive index of the core 161 along line L2, and the region 160b denotes the refractive index of the cladding 162 along line L2.

In the fusion splicing structure 20A, a cover resin (second cladding 113, resin 163) is removed from a given area that includes a fiber spliced portion C. Instead, the resin 31A flanks the fiber fused portion by covering directly the tip portion of the amplification optical fiber 11 (outer peripheral surface of the exposed first cladding 112) and the tip portion of the transmission optical fiber 16 (outer peripheral surface of the exposed cladding 162). The resin 31A may make up part or the entirety of a protective sleeve (FIG. 3).

Figure 6:
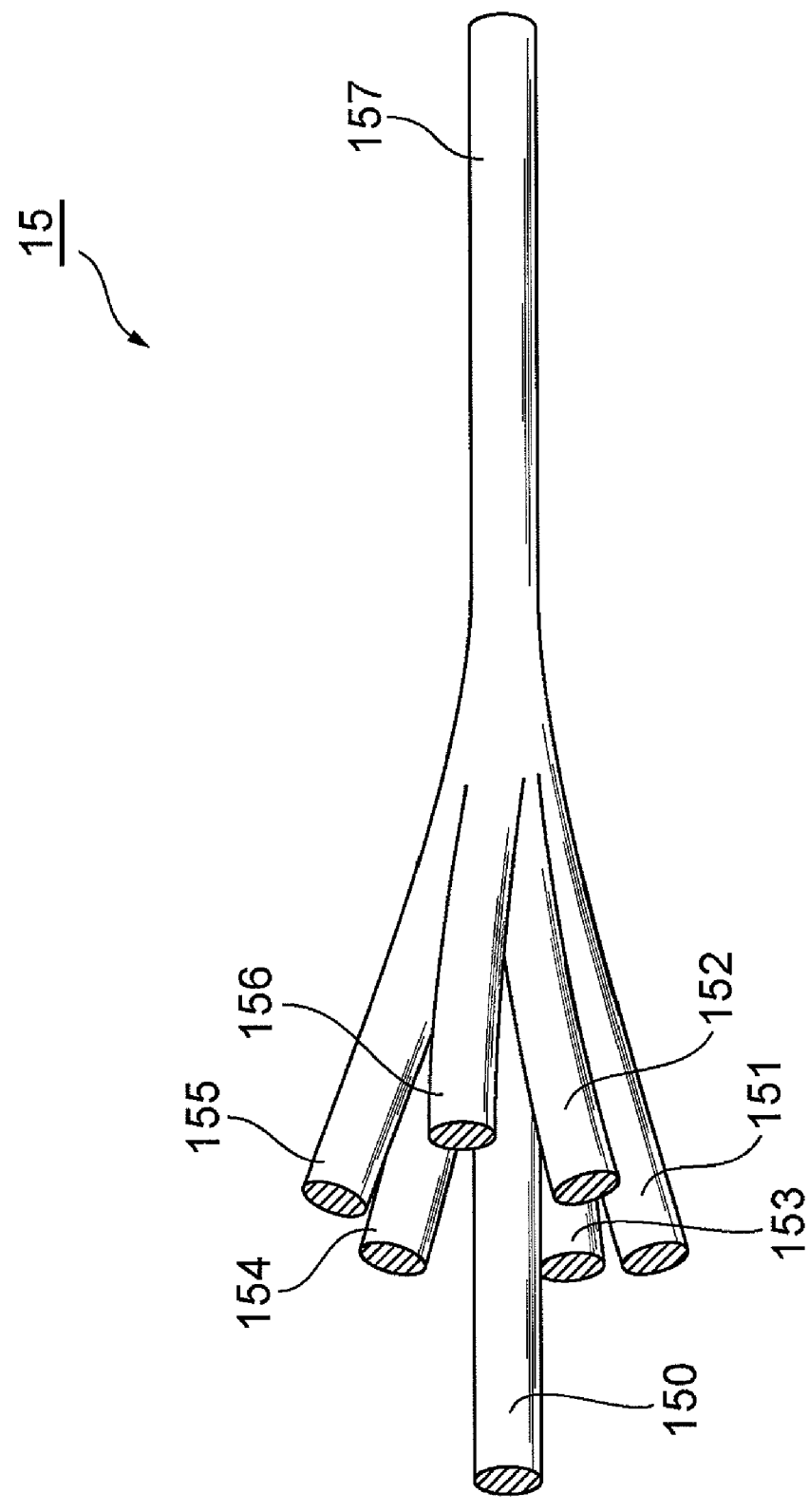
FIG. 6 is a view showing a configuration example of a combiner.

Light to be amplified A, which yields laser light, is amplified and gain is obtained every time pumping light B passes through the core 111 in the amplification optical fiber 11. The combiner 15, which combines the light to be amplified A and the pumping light B, is preferably the combining medium shown in FIG. 6. In FIG. 6, an optical fiber 150, to which there is inputted light to be amplified A that is outputted by the optical isolator 19, is bundled together with optical fibers 151 to 156, to which the pumping light outputted by the pumping light source 14 is inputted. In this state, the optical fibers 150 and 151 to 156 are connected to a double-cladding optical fiber 157 that is connected to the amplification optical fiber 11, to make up thereby the combiner 15.

Absorption of pumping light in the amplification optical fiber 11 is determined by the characteristics of the amplification optical fiber 11. These characteristics are modified mainly by adjusting the mode field diameter of the core 111, the diameter of the first cladding 112 and the rare earth concentration in the core 111. For example, a 5 m-long Yb-doped fiber having a doping concentration of about 10000 ppm, a mode field diameter of about 7 μm and a first cladding diameter of about 130 μm absorbs about 2.4 dB of pumping light at a pumping wavelength band of 915 nm. The pumping light that is not absorbed escapes through the other end of the amplification optical fiber 11. When using the above-described Yb-doped fiber as the amplification optical fiber 11, therefore, about 40% of the inputted pumping light is emitted through the exit end side opposite the end onto which pumping light is incident. The pumping light that gets through without being absorbed in the amplification optical fiber 11 will be referred hereinafter as transmitted pumping light.

Figure 7:
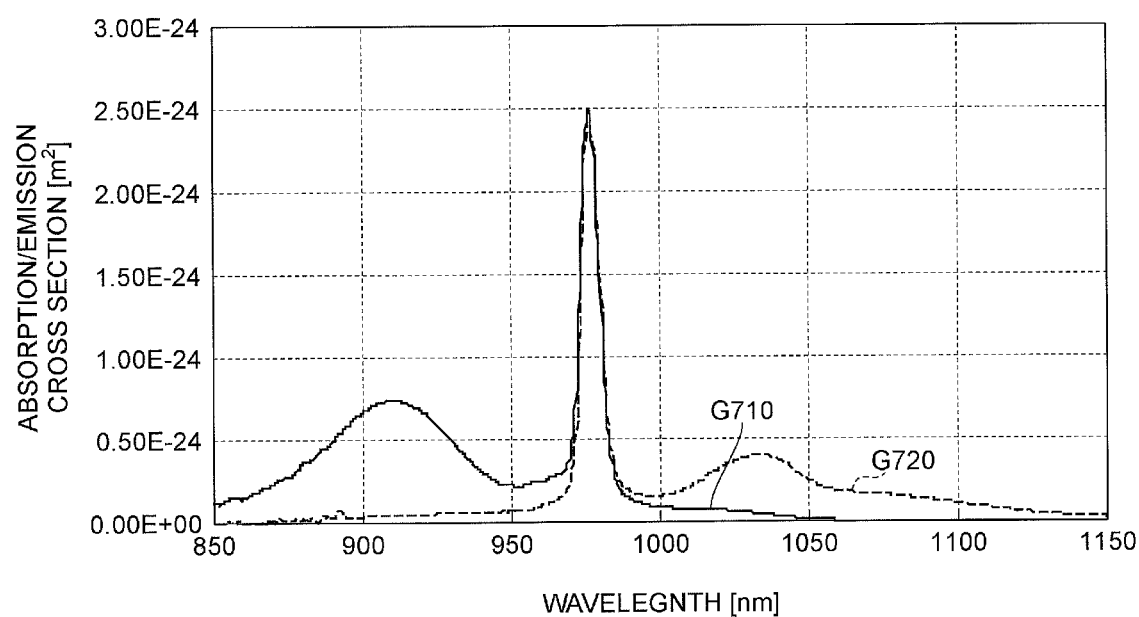
FIG. 7 is a graph showing the absorption coefficient and emission coefficient of an Yb-doped fiber.

When an Yb-doped fiber such as the above-described one is used as the amplification optical fiber 11, the pumping wavelength is set to a 915 nm band for amplification. However, using pumping light at the 975 nm band results in greater absorption than in the 915 nm band, and elicits also greater pumping efficiency, and hence the 975 nm band is preferable. FIG. 7 is a graph showing the absorption coefficient and emission coefficient of an Yb-doped fiber. In FIG. 7, the curve G710 represents absorption cross-sectional area and the curve G720 represents emission cross-sectional area. Yb is used in the above example, but the pumping wavelength changes when the rare earth with which the amplification optical fiber 11 is doped is different. Therefore, the pumping wavelength must be modified depending on the rare earth element with which the amplification optical fiber 11 is doped.

When, in a fusion splicing structure 21A, the refractive index of the resin 31A is lower than the refractive index of the first cladding 112 of the amplification optical fiber 11, the transmitted pumping light, outputted without being absorbed in the amplification optical fiber 11, goes on to propagate through the transmission optical fiber 16. In conventional technologies, optical components are inserted in order to reduce the power of the transmitted pumping light, and/or the amplification optical fiber 11 is lengthened to increase the amount of absorbed pumping light. Insertion of optical components is problematic on account of, for example, the greater loss associated therewith. The power of transmitted pumping light can be reduced by lengthening the amplification optical fiber 11, but a longer amplification optical fiber 11 gives rise to problems derived from non-linear phenomena, such as stimulated Raman scattering.

The pumping light is confined within the resonator when using a Q-switch configuration. As a result, there is no significant power leakage to the exterior of the resonator (i.e. the fiber fused portion between the amplification optical fiber and the transmission optical fiber).

As shown in FIG. 2, a transmission optical fiber 16 is often fusion-spliced after an amplification optical fiber 11. The transmission optical fiber 16, unlike the amplification optical fiber 11, is of single-cladding type, and comprises a core 161 through which only light to be amplified propagates, and a cladding 162 that confines light within the core 161. The cladding 162 is ordinary designed so that light does not propagate therethrough. The light to be amplified is caused to propagate along the core through fusion-splicing of the amplification optical fiber 11 and the transmission optical fiber 16.

Figure 8:
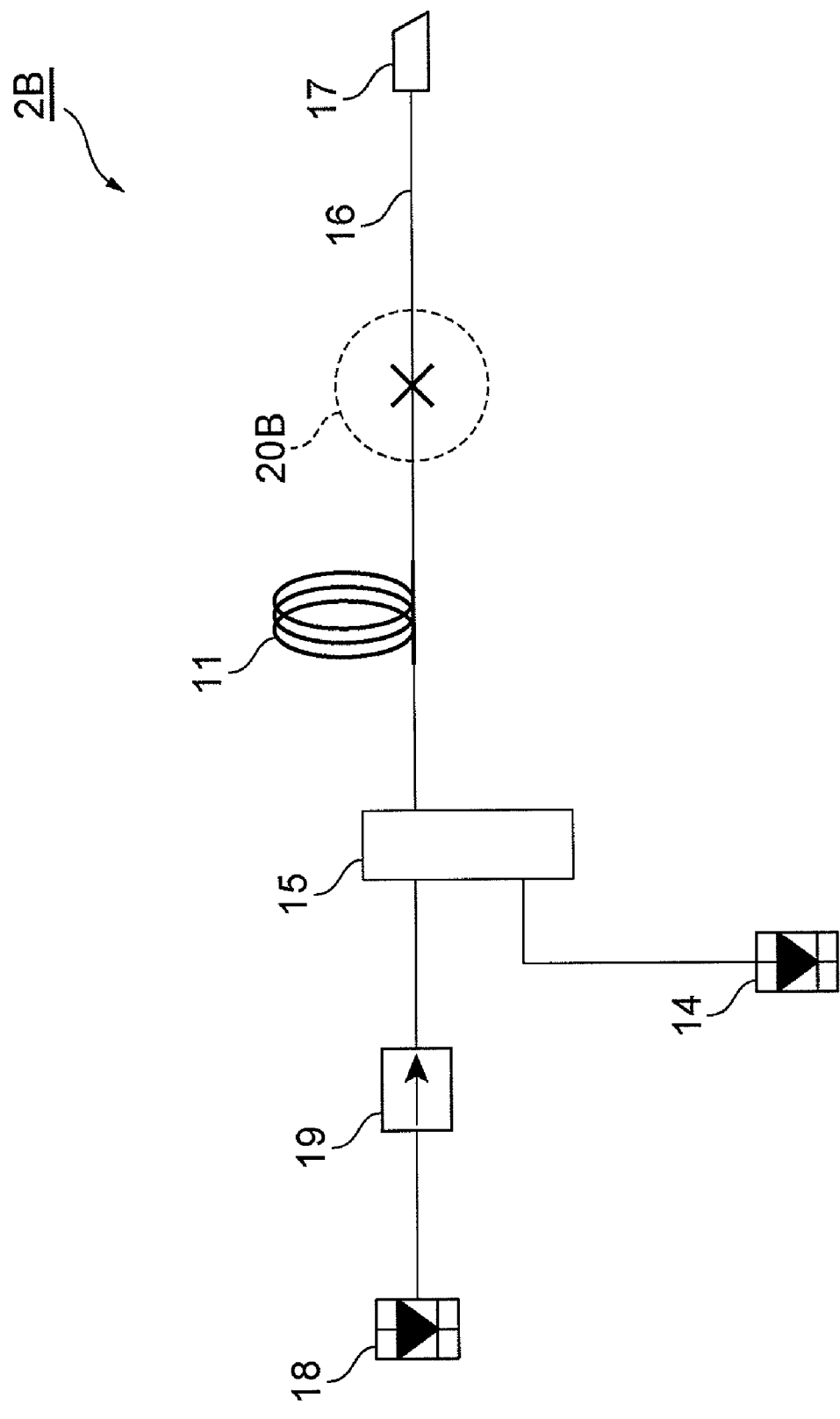
FIG. 8 is a view showing a configuration example of an MOPA-type fiber laser light source.

FIG. 8 is a view showing the configuration of an MOPA-type fiber laser light source 2B. FIGS. 9A and 9B are views showing the cross section of a fusion splicing structure 20B of the amplification optical fiber 11 and the transmission optical fiber 16. Upon comparison vis-à-vis the configuration shown in FIGS. 2 and 3, in the configuration shown in FIGS. 8 and 9A, in the fusion splicing structure 20B between the amplification optical fiber 11 and the transmission optical fiber 16 the cover resin (second cladding 113, resin 163) is removed at the respective tip portions thereof, and the amplification optical fiber 11 and the transmission optical fiber 16 are now directly covered by a pumping light-removing resin 31B having a higher refractive index than the first cladding 112 of the amplification optical fiber 11. In the fusion splicing structure 20B, the second cladding 113, which is a cover cladding, is removed from the tip portion of the amplification optical fiber 11. The periphery of the first cladding 112 is covered directly by the pumping light removing resin 31B having a higher refractive index than the first cladding 112. As a result, the confinement effect of the first cladding 112 is cancelled, and the transmitted pumping light can escape with higher efficiency out of the fiber.

Preferably, no air layer is interposed between the pumping light removing resin 31B and the first cladding 112, of the amplification optical fiber 11, so that there is high adherence between the pumping light removing resin 31B and the first cladding 112. The pumping light removing resin 31B may be a thermosetting resin or UV-curable resin. The resin yields a cover layer through curing after having been coated onto the first cladding 112. Alternatively, a pipe-like thermoplastic resin (for example, EVA (polyethylene vinyl acetate)) may be disposed on the first cladding, and be fused and cured through subsequent cooling, to cause the resin to coat the first cladding. It is preferable that the viscosity of the pumping light removing resin 31B is low during coating and fusion. The viscosity of the resin during coating is no greater than 50 Pa·s. In a state that the viscosity of the pumping light removing resin 31B is low, the resin may soften on account of the temperature of external air. This may preclude maintaining a constant strength. Accordingly, there may be disposed another resin 32, having a higher Young's modulus, around the low-viscosity pumping light removing resin 31B. The Young's modulus of the exterior-strengthening resin is high, of 300 to 1000 MPa.

In the fusion splicing structure 20B between the amplification optical fiber 11 and the transmission optical fiber 16, both optical fibers 11, 16 and a reinforcing member 33 are covered by the pumping light removing resin 31B, and these are in turn further covered by the resin 32, as shown in FIG. 9A. In such a structure, light leaking from the optical fibers 11, 16 into the resin 31B is absorbed by the reinforcing member 33 and is converted into heat. The converted heat does not accumulate in the pumping light removing resin 31B, but is dumped out of the protective sleeve by way of the reinforcing member 33. A projecting portion of the reinforcing member 33 may thrust beyond one or both sides of the resin 32, preferably both sides when the pumping light power is high. In this case, the protective sleeve is constituted by the pumping light removing resin 31B and the resin 32.

The reinforcing member 33, which resists the heat shrinkage of the protective sleeve, is disposed inside the pumping light removing resin 31B or in contact with the pumping light removing resin 31B. Exact and precise positioning of the reinforcing member 33 is difficult upon curing of the pumping light removing resin 31B, and hence the reinforcing member 33 need not be in contact with the resin 32. From the viewpoint of heat transport efficiency, the reinforcing member 33 preferably projects out of both sides of the pumping light removing resin 31B (FIG. 9A). In case of layout space problems, the reinforcing member 33 may project beyond one side alone. To curtail deterioration of the reinforcing member 33, the melting point of the reinforcing member 33 is preferably not lower than the melting point of the pumping light removing resin 31B. In terms of heat transportation from the resin 31B, the thermal conductivity of the reinforcing member 33 at normal temperature (25° C.) is preferably 100 W·m$^{-1}$·K$^{-1}$ or more. To increase light absorption in the reinforcing member 33, grooves 330 may be provided on the surface of the reinforcing member 33, as shown in FIGS. 9B and 9C. The grooves increase the surface area of the reinforcing member 33, and afford greater heat conversion efficiency.

A high refractive index of the pumping light removing resin 31B is not problematic on the side of the transmission optical fiber 16. The transmitted pumping light leaking out of the fibers does so via the pumping light removing resin 31B, is absorbed by the reinforcing member 33, and is converted into heat. The reinforcing member 33 projects out of the pumping light removing resin 31B. Herein, the projecting portion is preferably fixed by way of a tape, pipe or the like having a metal (in particular, copper) as a main component. Also, the outermost periphery of the splicing portion is preferably in contact with a material having excellent heat-transport ability, such as a metal or the like. When the resin 31B has poor heat-transport ability, heat may accumulate at the contact point between the resin and the above highly heat-transport material, through heating of the resin in the vicinity of the contact point, on account of the transmitted pumping light reflected by the highly heat-transport material, and through heating on account of absorption of the transmitted pumping light by the highly heat-transport material.

The explanation above has dealt with the risk of high-output pumping light escaping out of optical fibers, and has outlined methods for causing transmitted pumping light to escape out of optical fibers. The treatment of light escaping out of the optical fibers is explained next.

Figure 10:
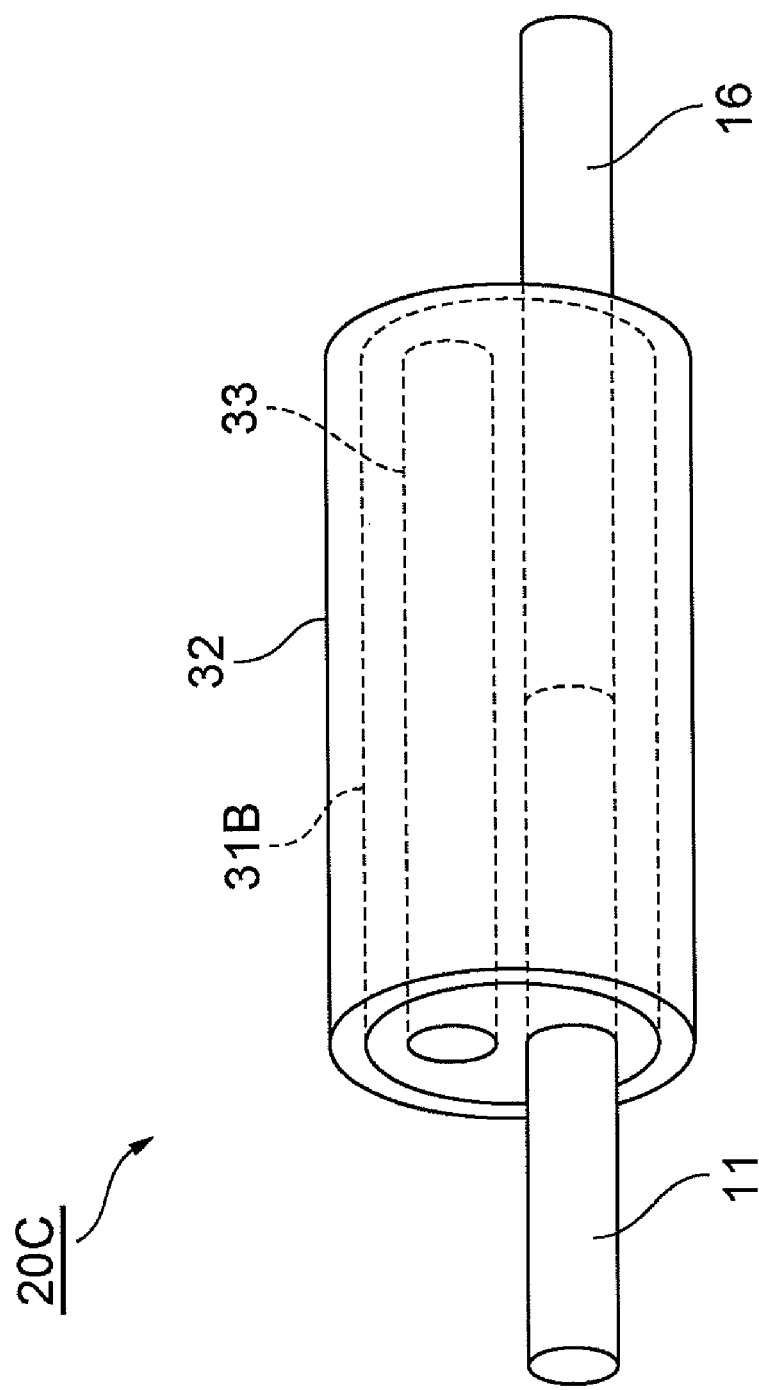
FIG. 10 is a view showing a fusion splicing structure of an amplification optical fiber and a transmission optical fiber.

FIG. 10 shows a configuration in which the reinforcing member 33, made of ferrous wire, is inserted into the resin 31B but does not project beyond the ends of the latter. Light leaking from the optical fibers into the resin 31B is absorbed by the reinforcing member 33 and is converted into heat. From the viewpoint of contraction resistance against contraction of the protective sleeve, the material used as the reinforcing member 33 is often iron or stainless steel. Ferrous reinforcing members have poor thermal conductivity, and hence heat may end up accumulating at the reinforcing member 33 and the resin 31B.

Figure 11:
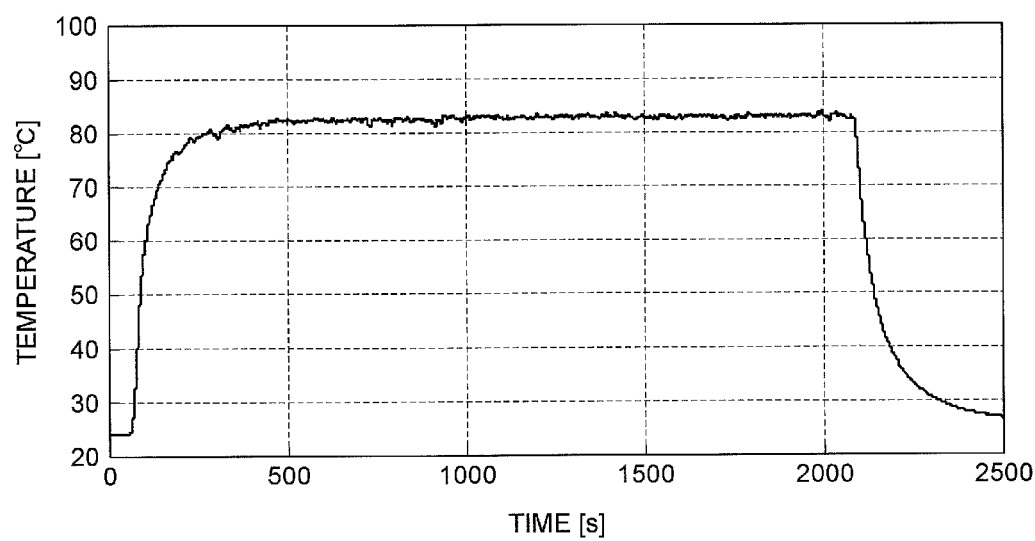
FIG. 11 is a graph showing temperature measurement results of a reinforcing member in a fusion splicing portion of an amplification optical fiber and a transmission optical fiber.

Actual measurements of the power of transmitted pumping light have revealed that the temperature at the leading end of a ferrous reinforcing member 33 is 80° C. or higher for a transmitted pumping light of about 1.6 W, as shown in FIG. 11. The temperature of the reinforcing member reaches 120° C. or more at the center of a fusion splicing structure 20C (for example, at the periphery of the fiber fused portion). The pumping light removing resin 31B and the surrounding resin 32 may soften at a temperature of 120° C. or above. This may result in optical fiber breakage or burning, and/or in increased generation of heat within the device in which the fiber fused portion is housed, and which may have a negative effect on other optical components in the device (for example, temperature control anomalies in pumped laser diodes). The high-temperature region may extend beyond the periphery of the fiber fused portion up to the output side in the propagation direction of the pumping light. Temperature can be controlled to some extent through the use of a Peltier element. When the influence of heat is substantial, thermal control is preferably performed on the basis of the temperature of the reinforcing member around the fusion-splicing point that is expected to reach the highest temperature, and on the basis of the temperature of the pumping light removing resin that surrounds that reinforcing member.

Figure 12:
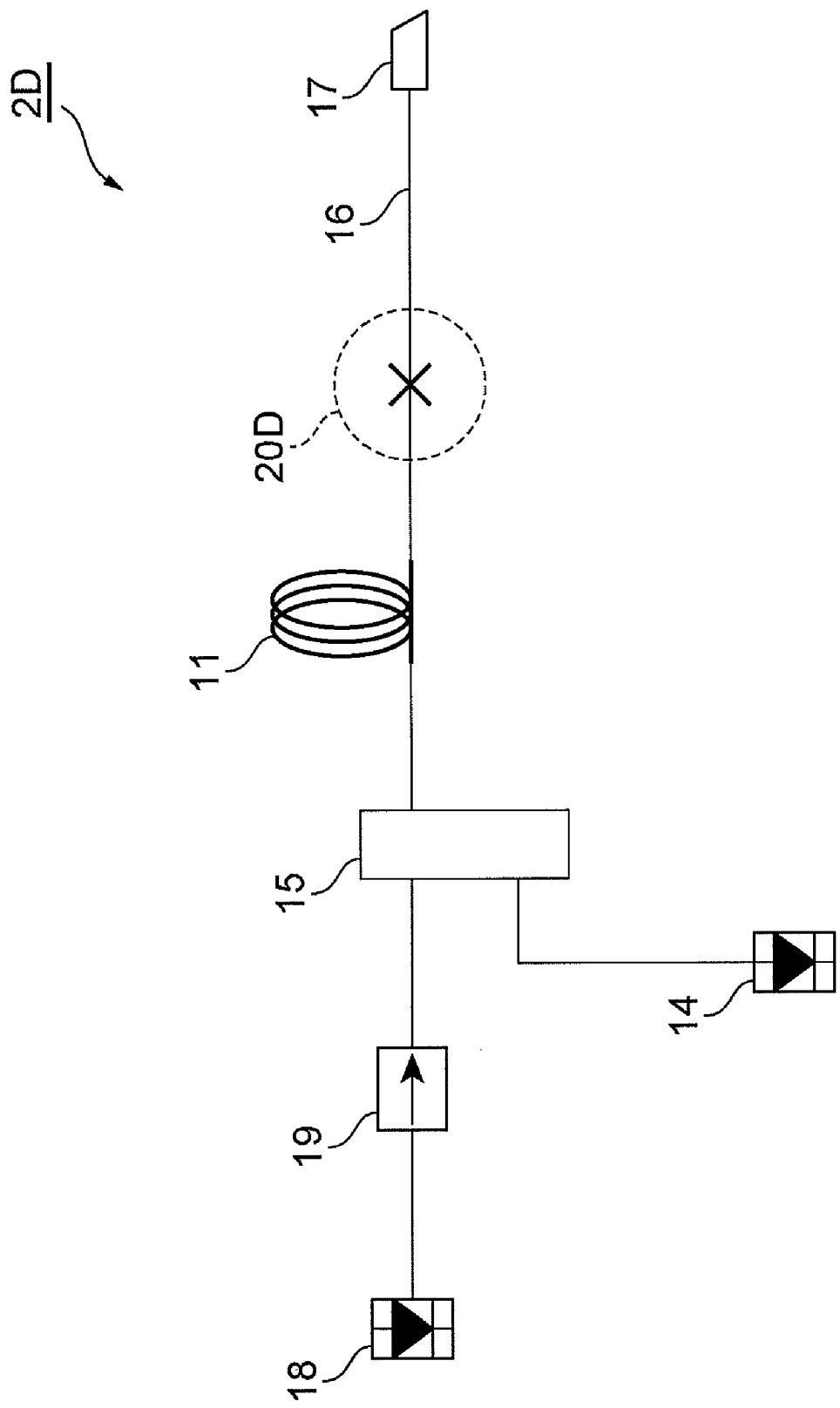
FIG. 12 is a view showing a configuration example of an MOPA-type fiber laser light source.
Figure 13:
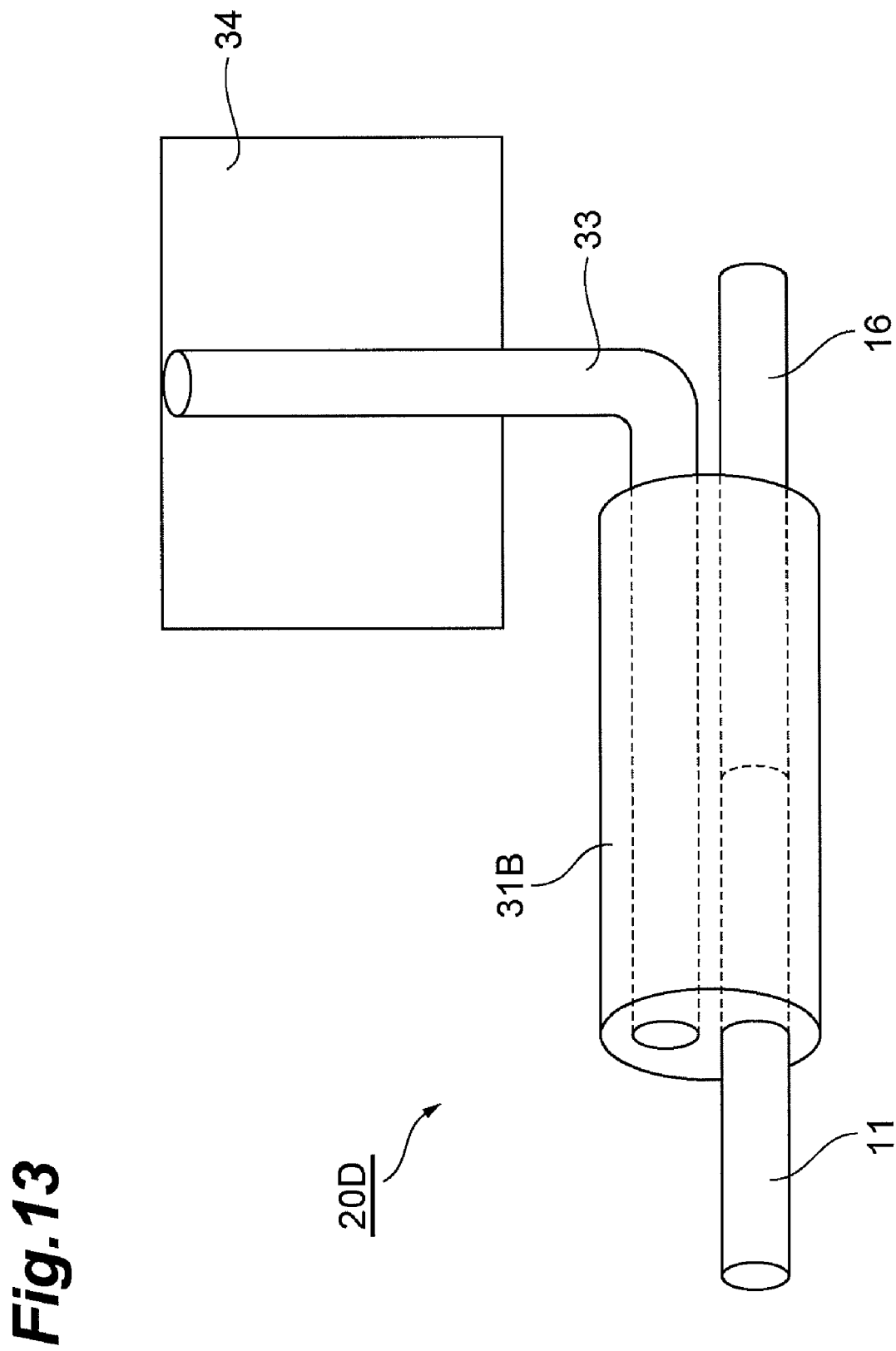
FIG. 13 is a view showing a fusion splicing structure of an amplification optical fiber and a transmission optical fiber.

Next, a method, increasing the heat-transport effect during conversion of light leaking from optical fibers into heat, will be explained. FIG. 12 is a view showing the configuration of an MOPA-type fiber laser light source 2D. FIG. 13 is a view showing the configuration of the fusion splicing structure 20D of the optical fiber for amplification 11 and the transmission optical fiber 16. The reinforcing member 33 of the fusion splicing structure 20D is changed herein to a material having high thermal conductivity, and which is not iron or stainless steel. Suitable materials that are used as the reinforcing member 33 having good thermal conductivity include, for example, copper, aluminum, silver, gold or a heat pipe. Also, part of the reinforcing member 33 is disposed so as to project out of the pumping light removing resin 31B of the fusion splicing structure 20D. In this case, the heat inside the fusion splicing structure 20D is conducted via the reinforcing member 33 to be dumped out of the fusion splicing structure 20D. Heat transportation can be further enhanced by way of a heat-transport plate 34. There are cases in which the power of the transmitted pumping light results in little heat generation. The heat-transport plate 34 is not necessary in such cases.

Figure 14:
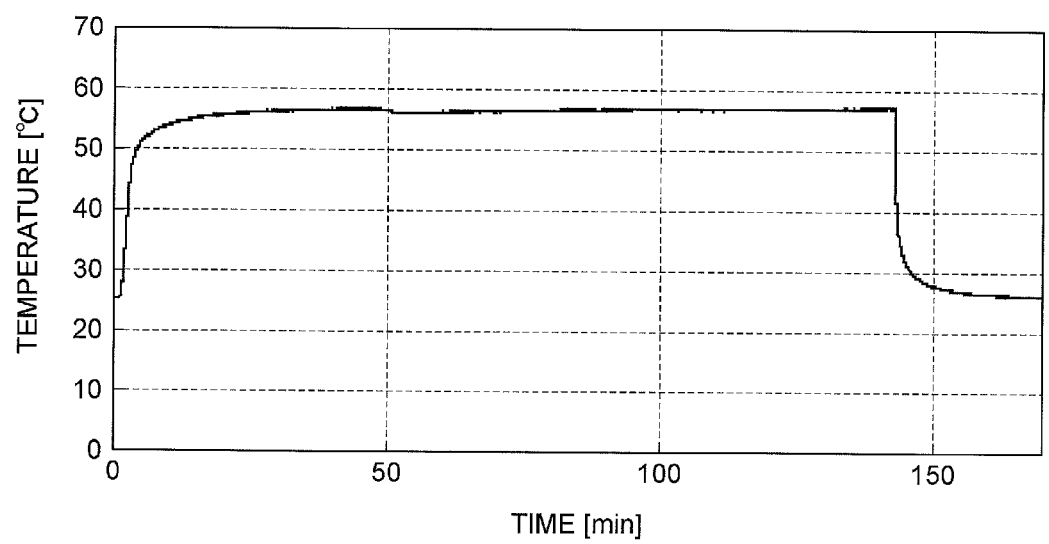
FIG. 14 is a graph showing temperature measurement results of a reinforcing member in a fusion splicing portion of an amplification optical fiber and a transmission optical fiber.
Figure 15:
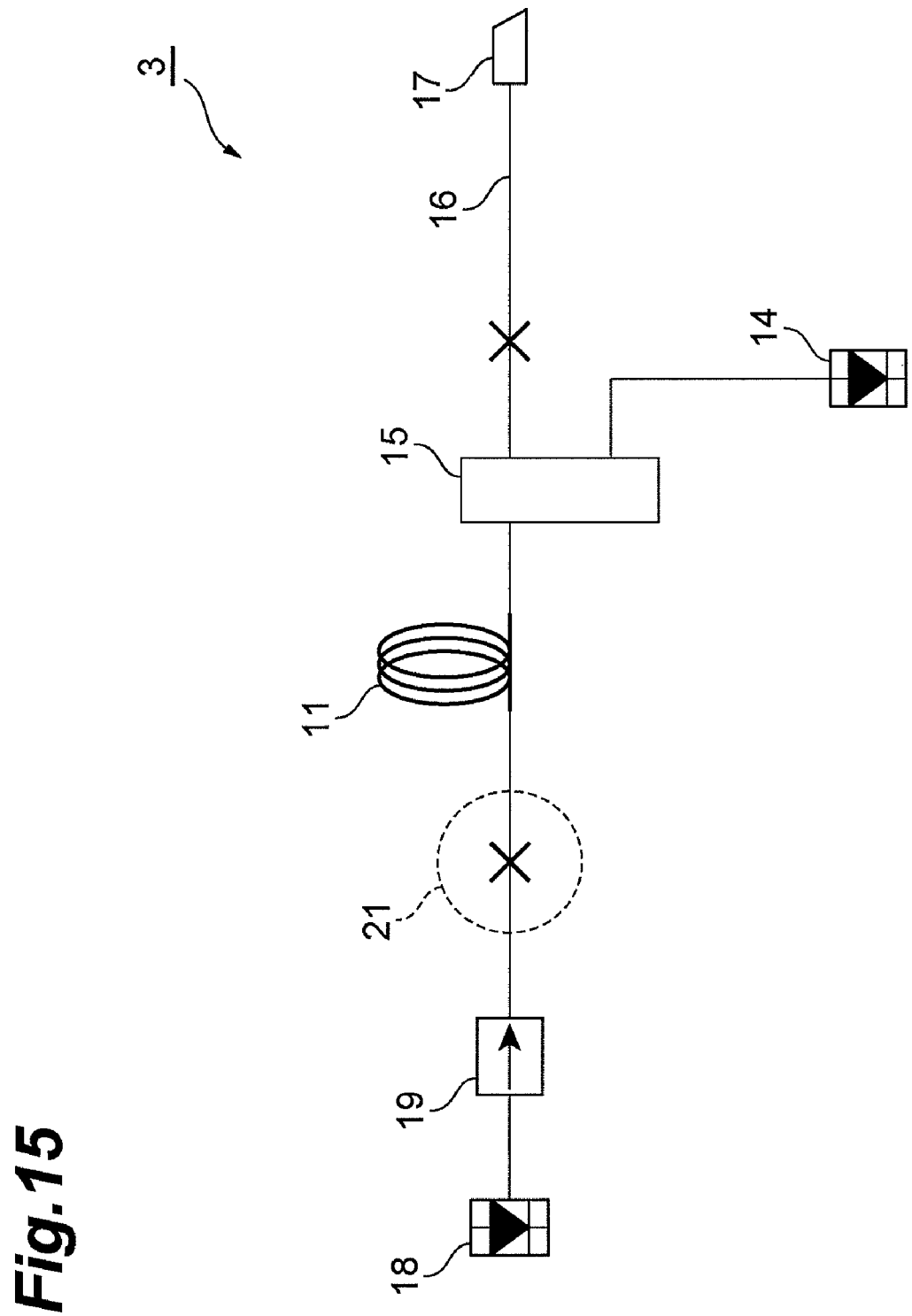
FIG. 15 is a view showing a configuration example of a backward pumped MOPA-type fiber laser light source.

As a concrete example, the reinforcing member 33 in the fusion splicing structure 20D was changed to copper, and the reinforcing member 33 was affixed to a heat-transport plate 34 outside the protective sleeve, to elicit heat transportation. Under a transmitted pumping light of about 2.4 W, the temperature at the leading end of the reinforcing member 33 dropped to about 57° C., as shown in FIG. 14, which was indicative of the achieved heat transport effect. The above effect can be enhanced by improving the adherence of the heat transport portion. A Peltier element may be used to control the temperature.

The thermal conductivity of copper used in the present example is 390 W/(m·K), while the thermal conductivity of iron is 84 W/(m·K). The reinforcing member 33 affords sufficient reinforcing even when using copper. Also, the reinforcing member 33 is fixed when assembled into the device, and hence the reinforcing member 33 is strong enough. The light to be amplified may leak out on account of deficient splicing between fibers at the fusion splicing structure. However, the power of pumping light leaking out of the fibers is greater than that of light to be amplified, and hence the absorption characteristics of the material of the reinforcing member 33 are preferably higher at the wavelength of the pumping light than at the wavelength of the light to be amplified.

Figure 16:
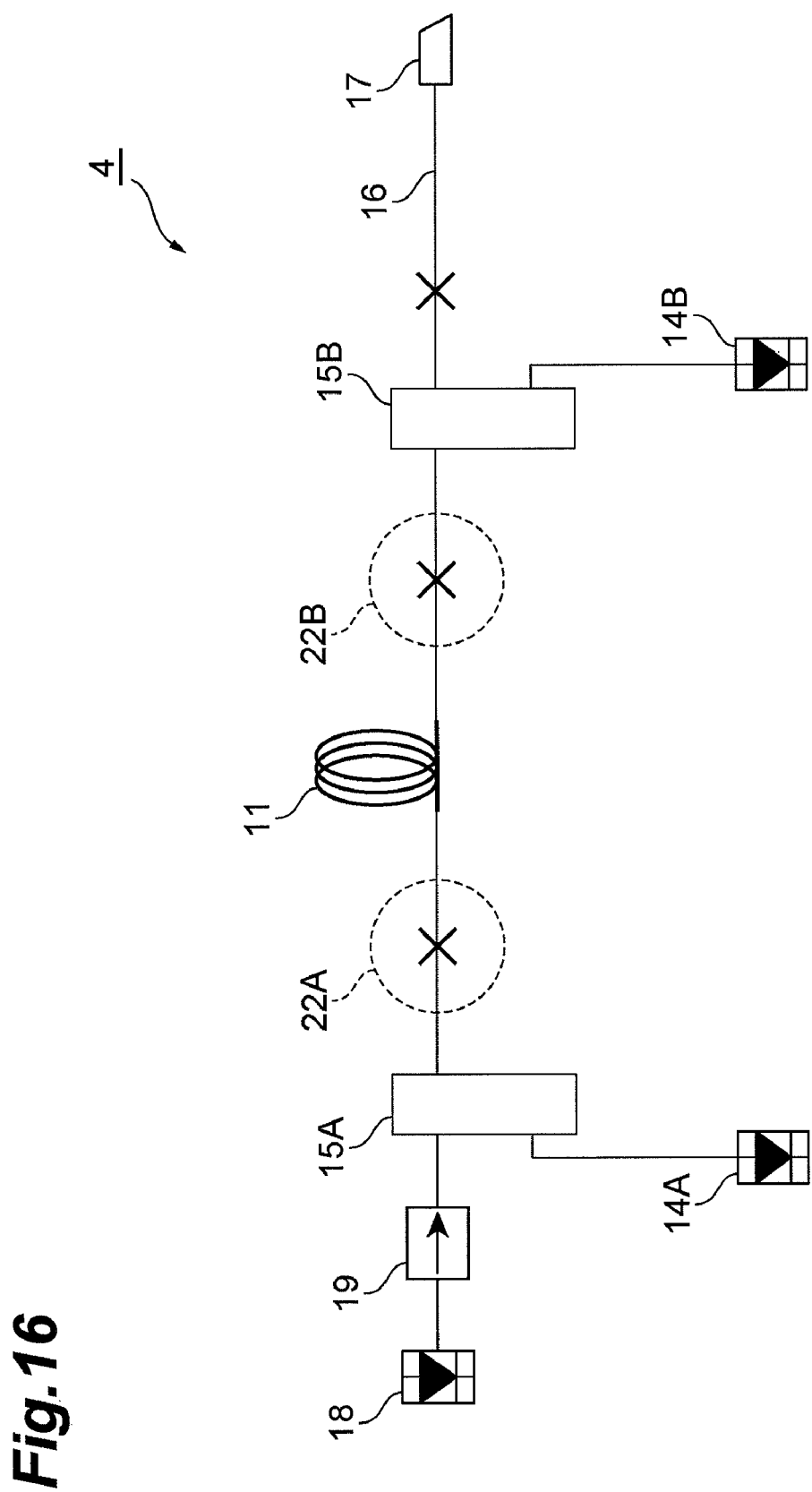
FIG. 16 is a view showing a configuration example of a bidirectionally pumped MOPA-type fiber laser light source.

The above explanation deals with forward pumping, in which pumping light is supplied in the same direction as the propagation direction of the light to be amplified in the amplification optical fiber 11. The method of pumping the light to be amplified, however, may also be backward pumping, in which pumping light is supplied in the reverse direction to the propagation direction of the light to be amplified in the amplification optical fiber 11 (FIG. 15), or bidirectional pumping, in which pumping light is supplied to the amplification optical fiber 11 in both directions (FIG. 16).

In an fiber laser light source using backward pumping (FIG. 15), pumping light outputted by the pumping light source 14 passes through the combiner 15 and is supplied into the amplification optical fiber 11 in the reverse direction. The pumping light pumps the rare earth elements comprised in the amplification optical fiber 11. The light to be amplified (seed light) outputted by the seed light source 18 passes through the optical isolator 19 and is inputted to the amplification optical fiber 11. The light is amplified in the amplification optical fiber 11. The amplified light passes through the combiner 15, the transmission optical fiber 16 and the end cap 17 and is outputted out of the fiber laser light source 3. The optical fiber extending from the optical isolator 19 and the amplification optical fiber 11 are fusion-spliced at a fusion splicing structure 21.

In an fiber laser light source using bidirectional pumping (FIG. 16), pumping light outputted by a pumping light source 14A in a fiber laser light source 4 passes through a combiner 15A and is supplied into the amplification optical fiber 11 in the forward direction. The pumping light outputted by the a pumping light source 14B passes through a combiner 15B and is supplied to the amplification optical fiber 11 in the reverse direction. The bi-directionally supplied pumping light pumps rare earth elements comprised in the amplification optical fiber 11. The light to be amplified (seed light) outputted by the seed light source 18 passes through the optical isolator 19 and the combiner 15A and is inputted to the amplification optical fiber 11, where it is amplified. The amplified light passes through the combiner 15B, the transmission optical fiber 16 and the end cap 17 and is outputted out of the fiber laser light source 4. The optical fiber extending from the combiner 15A and the amplification optical fiber 11 are fusion-spliced at a fusion splicing structure 22A. The optical fiber extending from the combiner 15B and the amplification optical fiber 11 are fusion-spliced at a fusion splicing structure 22B.

The fusion splicing structures 21, 22A and 22B can elicit the same effect through the use of the configuration of the present invention.

Figure 17:
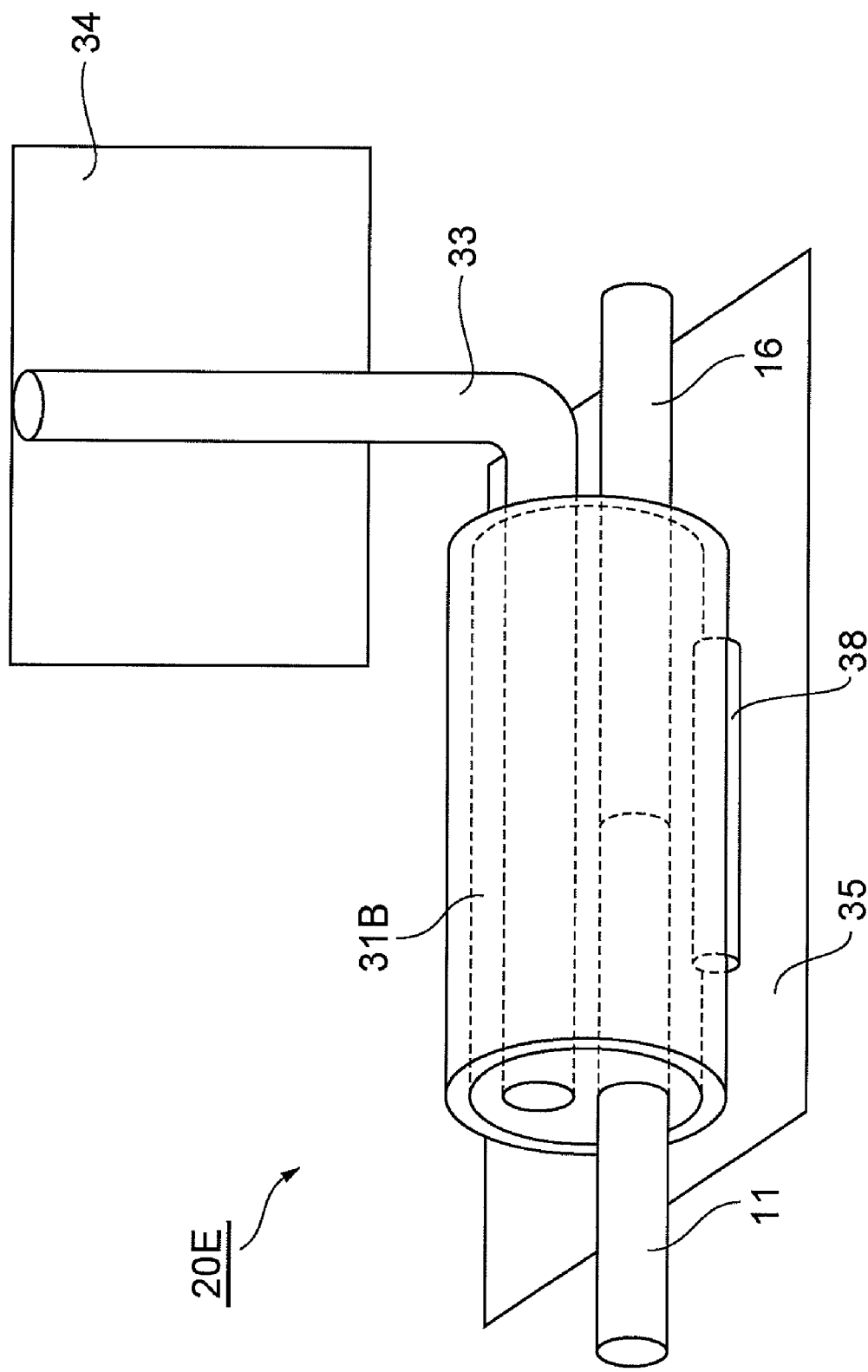
FIG. 17 is a view showing a fusion splicing structure of an amplification optical fiber and a transmission optical fiber.

Next, a configuration, achieving an effect of supplementing and aiding heat transportation by the reinforcing member 33, will be explained. In a fusion splicing structure 20E of the amplification optical fiber 11 and the transmission optical fiber 16, as shown in FIG. 17, the fiber fused portion between the tip portion of the amplification optical fiber 11 (second cladding 113 removed) and the tip portion of the transmission optical fiber 16 (cladding 162 removed) is covered by the resin 31B having a higher refractive index than the first cladding 112 of the amplification optical fiber 11. Part of the reinforcing member 33 is positioned inside the resin 31B, while a thermal transfer member 38 having better thermal conductivity than stainless steel is adhered to the outer side of the resin 31B, on the opposite side to the reinforcing member 33. The thermal transfer member 38 contributes to transport heat that accumulates on the opposite side. A heat-transport fitting such as a heat sink is brought into contact with the outer side of the thermal transfer member 38, to let out heat derived from the transmitted pumping light, and to prevent heat from flowing back to the optical fibers. The degree of freedom of the configuration may also be increased by mounting a heat-transport plate 35 having good thermal conductivity, such as a copper plate, on the outside of the cylinder.

Next, a method, dealing with anomalies of the amplification optical fiber 11 using a configuration that employs the above-described reinforcing member 33, will be explained. The pumping light absorbed by the above-described amplification optical fiber 11 is converted into heat in the fusion splicing structure. In case of anomalies, such as breakage of the amplification optical fiber 11, the laser light and pumping light leaking out of the broken fiber may damage other optical components. In particular, the pumping light source 14 may be damaged on account of, for example, reflection caused by the broken fiber. The output of the pumping light source 14 or of the seed light source 18 must be lowered or shut down immediately in case of anomalies such as breakage of the amplification optical fiber 11.

In the configuration shown in FIGS. 18 to 21, the temperature of the fusion splicing structure is detected by a heat detecting device 36. When the detected temperature is equal to or lower than a given threshold value, the output of the seed light source 18 or of the pumping light source 14 is shut down or reduced. The above occurrence is notified by way of an alarm 40, or is displayed on a display, as the case may require. Conventional reinforcing members such as iron or stainless steel have poor thermal conductivity. During a high-temperature state, therefore, it takes some time for the temperature to drop below the temperature threshold value after the occurrence of the anomaly in the fiber. By contrast, the threshold value is reached in a short time when using a reinforcing member 33 that comprises a material having high thermal conductivity, such as copper, aluminum, silver or gold, or a heat pipe, in which temperature changes are fast. Secondary problems can also be averted thanks to the shorter time elapsed since the occurrence of an anomaly in the fiber until pumping light or laser light is brought under control.

Figure 18:
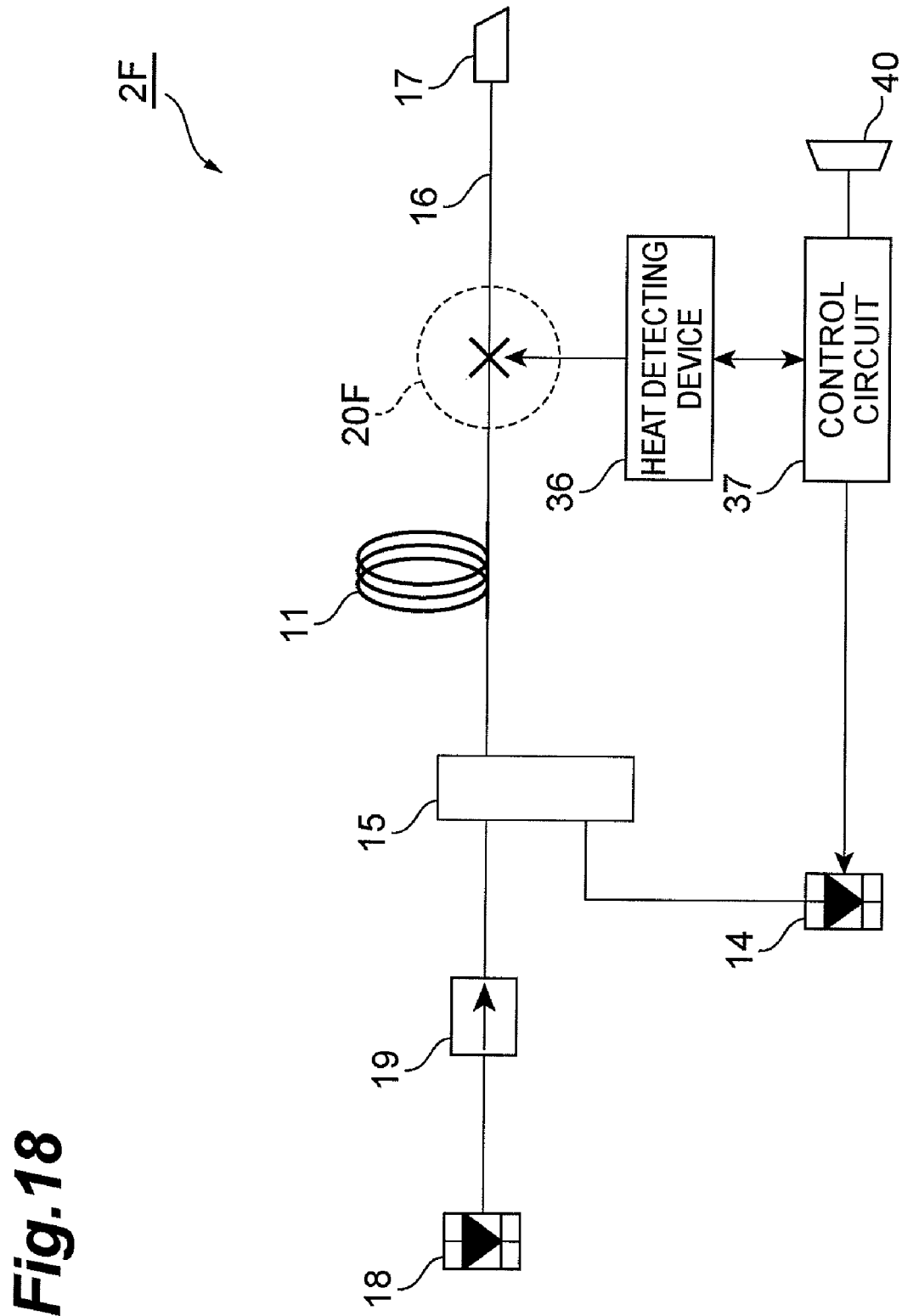
FIG. 18 is a view showing a configuration example of an MOPA-type fiber laser light source.
Figure 19:
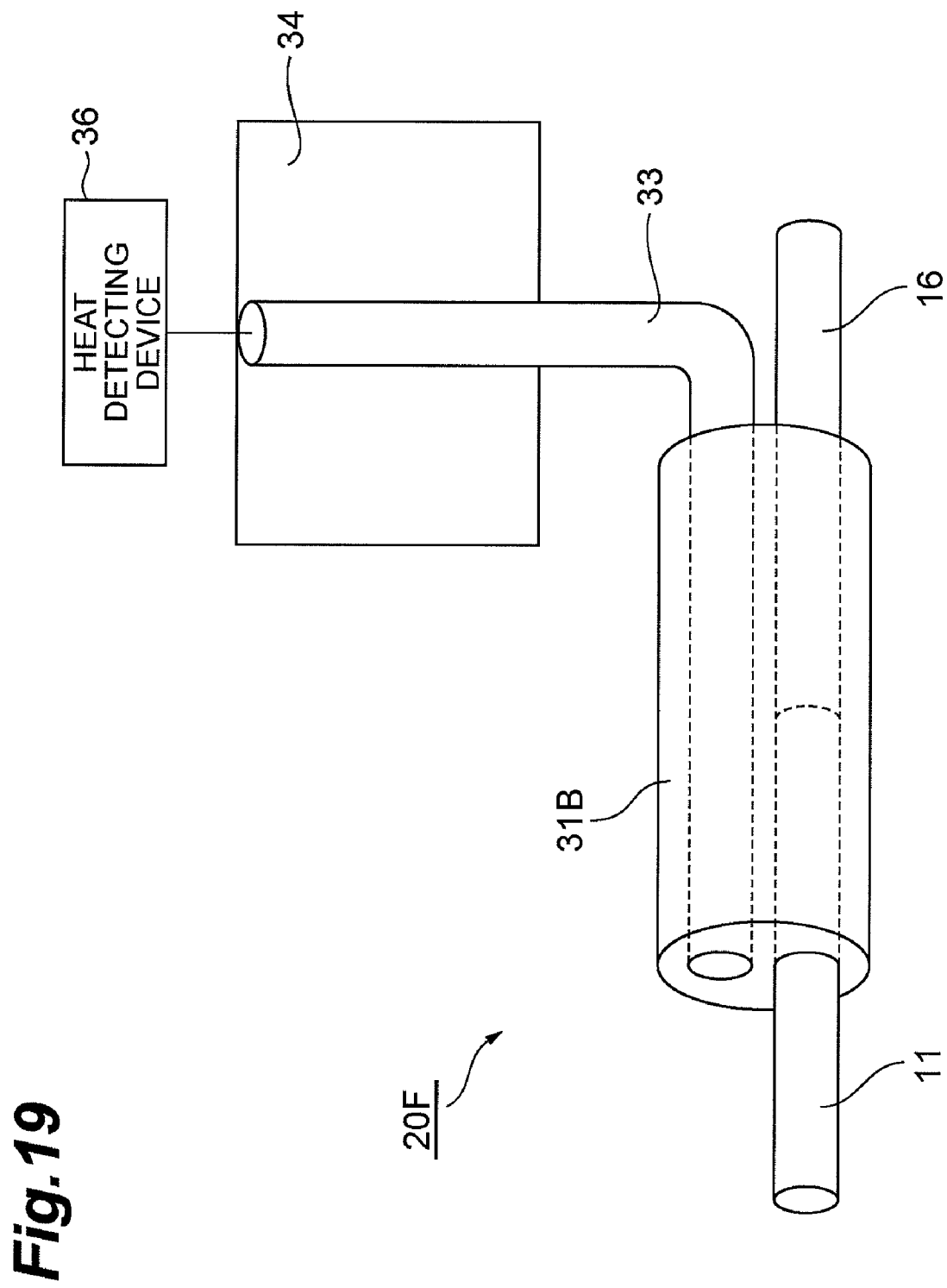
FIG. 19 is a view showing a fusion splicing structure of an amplification optical fiber and a transmission optical fiber.
Figure 20:
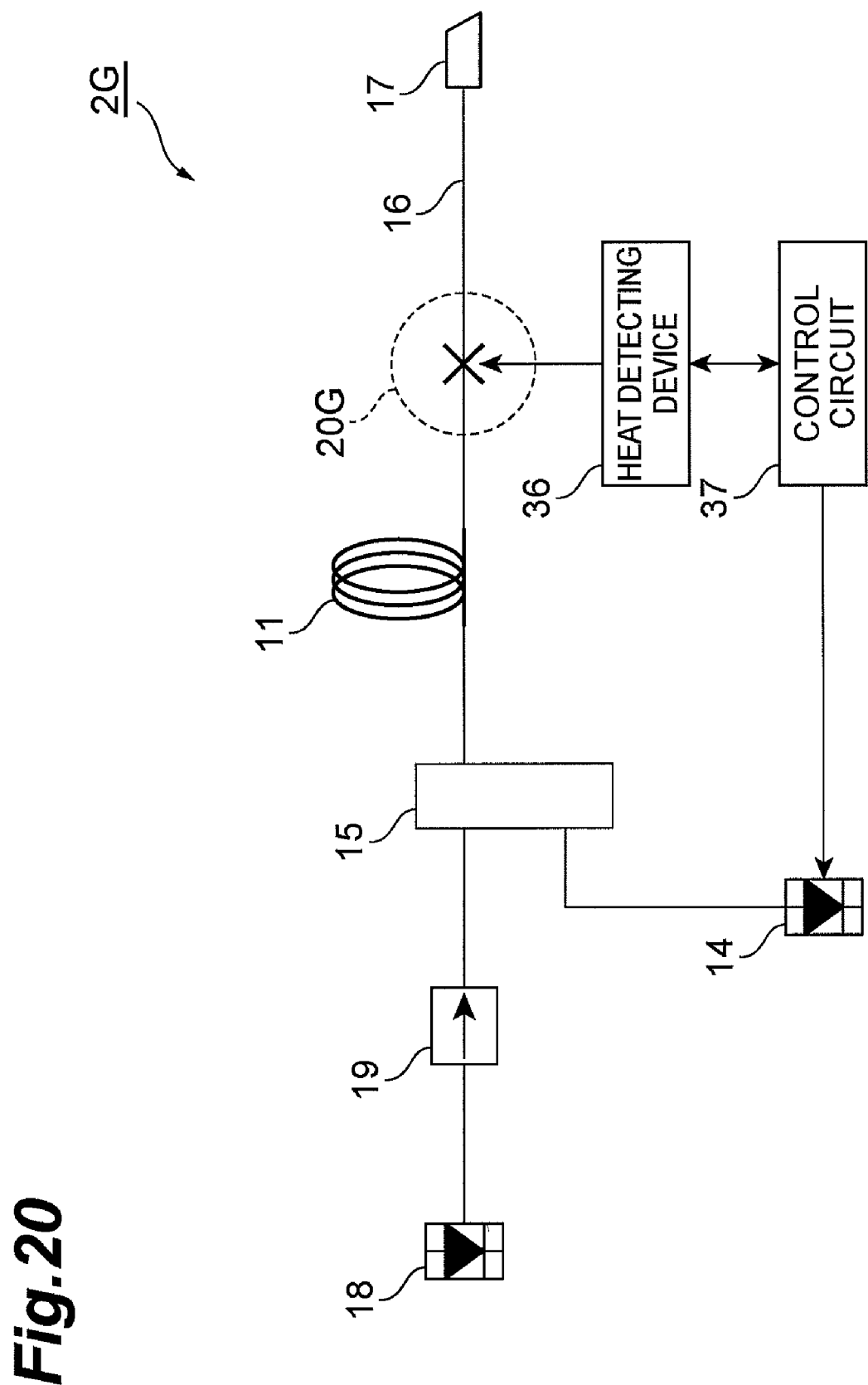
FIG. 20 is a view showing the configuration of an MOPA-type fiber laser light source.
Figure 21:
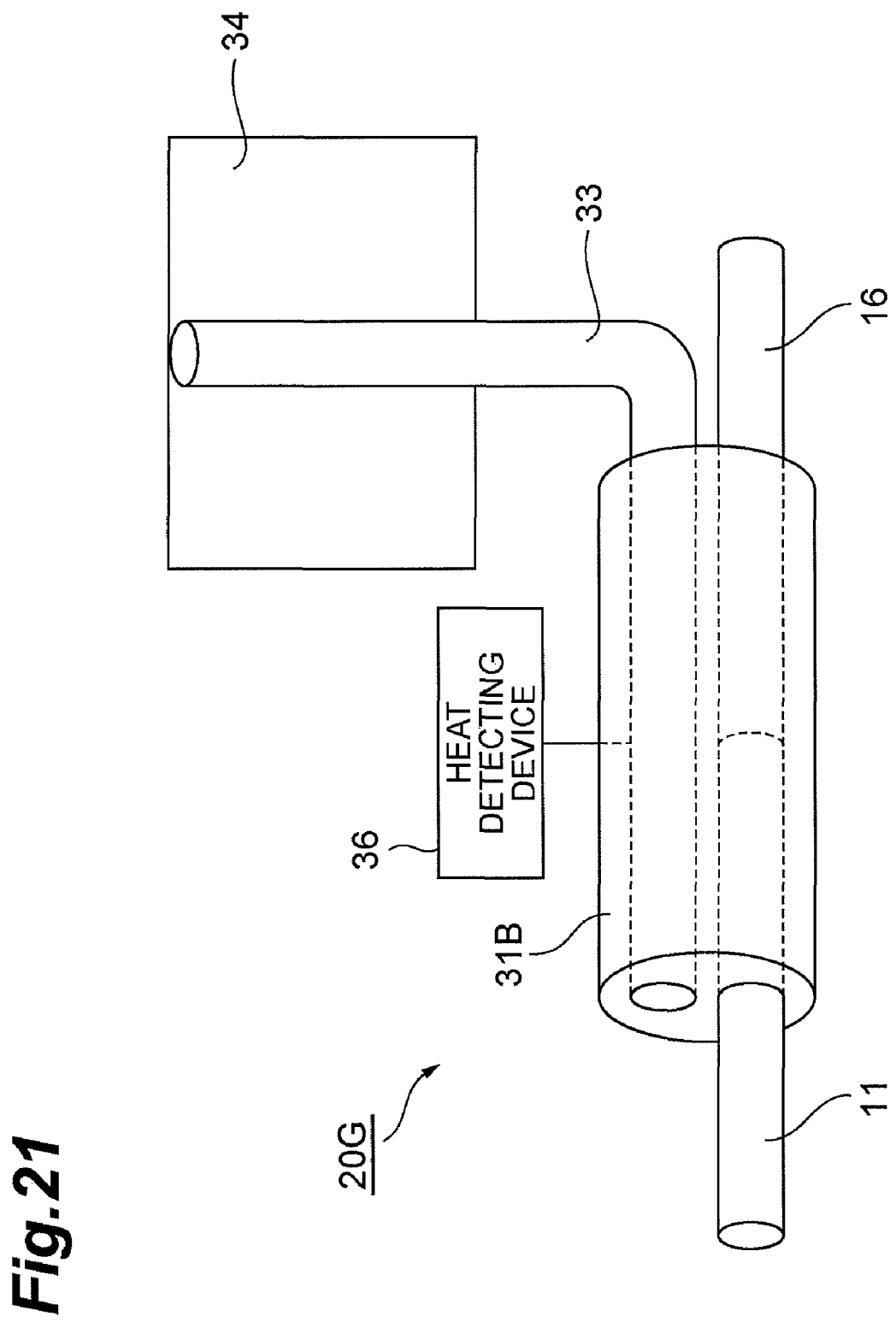
FIG. 21 is a view showing a fusion splicing structure of an amplification optical fiber and a transmission optical fiber.

In a fusion splicing structure 20F of a fiber laser light source 2F as shown in FIGS. 18 and 19, the temperature of part of the reinforcing member 33 that is exposed outside the resin 31B may be detected by a heat detecting device 36, so that the pumping light source 14 and so forth can then be controlled by a control circuit 37 on the basis of the detected temperature. In a fusion splicing structure 20G of a fiber laser light source 2G as shown in FIGS. 20 and 21, the temperature of the portion of the reinforcing member 33 that is inside the resin 31B may be detected by a heat detecting device 36, so that the pumping light source 14 and so forth can then be controlled by a control circuit 37 on the basis of the detected temperature. Heat can be detected earlier in the latter configuration.

As described above, the optical module according to the present invention, thus, allows lessening adverse contingencies, such as increased number of fusion splices, drops in output, and higher costs associated with a greater number of optical components.

What is claimed is:

1. An optical module, comprising:
  an amplification optical fiber including: a core through which light to be amplified propagates; a first cladding which is provided on an outer periphery of the core and through which pumping light propagates; and a second cladding having a lower refractive index than the first cladding and functioning as a cover resin to the first cladding;
  a pumping light source supplying the pumping light to the amplification optical fiber;
  a transmission optical fiber allowing single mode propagation of the light to be amplified, the transmission optical fiber being provided on the end from which the pumping light is outputted, of the ends of the amplification optical fiber; and
  a fusion splicing structure connecting the amplification optical fiber to the transmission optical fiber, in a state where a cover resin is removed at the tip portions, including the end faces, of the amplification optical fiber and the transmission optical fiber,
  wherein the fusion splicing structure includes:
  a pumping light removing resin that makes up part or the entirety of a protective sleeve that covers directly the tip portions of the amplification optical fiber and the transmission optical fiber from which the cover resin is removed, the pumping light removing resin having a higher refractive index than the first cladding; and
  a reinforcing member that resists heat shrinkage of the protective sleeve, while a portion of the reinforcing member, including at least one of the ends thereof, is disposed outside the pumping light removing resin, the rest of the reinforcing member being disposed inside the protective sleeve, whereby heat that accumulates in the reinforcing member is transported through a projecting portion of the reinforcing member that includes the other end thereof and that is exposed from the pumping light removing resin.

2. An optical module according to claim 1, wherein the reinforcing member has heat radiating means provided on the projecting portion thereof, for enhancing heat transportation from the reinforcing member.

3. An optical module according to claim 1, wherein the reinforcing member has a melting point equal to or higher than that of the pumping light removing resin.

4. An optical module according to claim 3, wherein the reinforcing member has a thermal conductivity of 100 W·m$^{-1}$·K$^{-1}$ or more at 25° C.

5. An optical module according to claim 1, wherein the reinforcing member has a groove on the surface thereof.

6. An optical module according to claim 1, further comprising a cover layer provided on the outer periphery of the pumping light removing resin, the cover layer having a refractive index lower than that of the pumping light removing resin but higher than that of air.

7. An optical module according to claim 1, wherein the reinforcing member has an absorption coefficient whose value at a wavelength of pumping light is higher than that at a wavelength of light to be amplified.

8. An optical module according to claim 1, further comprising:

a temperature detector detecting a temperature of the reinforcing member; and an alarm unit issuing an alarm when the temperature detected by the temperature detector is equal to or lower than a predetermined temperature threshold value.

9. An optical module according to claim 1, further comprising:

a temperature detector detecting a temperature of the reinforcing member; and a control unit controlling a pumping light source driving current that is supplied to the pumping light source, when the temperature detected by the temperature detector is equal to or lower than a predetermined temperature threshold value.

* * * * *